US006733689B1

(12) United States Patent
Meyer et al.

(10) Patent No.: US 6,733,689 B1
(45) Date of Patent: May 11, 2004

(54) LIQUID-CRYSTALLINE COMPOSITION FOR PRINTING INKS, COATINGS AND COUNTERFEIT-PROOF MARKING OF ARTICLES

(75) Inventors: Frank Meyer, Heidelberg (DE); Hiroki Ishida, Tokyo (JP); Peter Schuhmacher, Mannheim (DE); Horst Neumann, Ludwigshafen (DE)

(73) Assignee: BASF Drucksysteme GmbH, Stuttgart (DE)

( * ) Notice: Subject to any disclaimer, the term of this patent is extended or adjusted under 35 U.S.C. 154(b) by 0 days.

(21) Appl. No.: 09/890,282

(22) PCT Filed: Feb. 5, 2000

(86) PCT No.: PCT/EP00/00915

§ 371 (c)(1),
(2), (4) Date: Aug. 10, 2001

(87) PCT Pub. No.: WO00/47694

PCT Pub. Date: Aug. 17, 2000

(30) Foreign Application Priority Data

Feb. 10, 1999 (DE) .......................................... 199 05 394

(51) Int. Cl.[7] .............................................. C09K 19/52
(52) U.S. Cl. ................................................ 252/299.01
(58) Field of Search ...................... 252/299.01–299.03, 252/299.6–299.68, 299.1, 299.2, 299.3

(56) References Cited

U.S. PATENT DOCUMENTS

| 5,798,147 | A | * | 8/1998 | Beck et al. ............... 252/299.5 |
| 6,136,225 | A | * | 10/2000 | Meyer et al. ........... 252/299.01 |
| 6,217,792 | B1 | * | 4/2001 | Parri et al. ............. 252/299.61 |
| 6,217,948 | B1 | * | 4/2001 | Verrall et al. ............ 252/299.6 |
| 6,291,065 | B1 | * | 9/2001 | Poetsch et al. ......... 252/299.01 |

FOREIGN PATENT DOCUMENTS

| DE | 197 16 822 | 10/1998 |
| DE | 197 38 369 | 3/1999 |
| GB | 2 328 436 | 2/1999 |
| WO | WO 96/02597 | 2/1996 |
| WO | WO 97/00600 | 1/1997 |

* cited by examiner

Primary Examiner—Mark F. Huff
Assistant Examiner—Jennifer R. Sadula
(74) Attorney, Agent, or Firm—Oblon, Spivak, McClelland, Maier & Neustadt, P.C.

(57) ABSTRACT

A liquid-crystalline composition contains, as components, a liquid-crystalline mixture containing at least one compound having two polymerizable groups and at least one compound having only one polymerizable group, and optional further additives. The liquid crystalline composition can be used for printing or coating substrates, in electro-optical components, for counterfeiting-proof marking of articles and for the production of films or coatings which selectively reflect light in the wavelength range from 250 to 1300 nm.

17 Claims, No Drawings

LIQUID-CRYSTALLINE COMPOSITION FOR PRINTING INKS, COATINGS AND COUNTERFEIT-PROOF MARKING OF ARTICLES

The present invention relates to a liquid-crystalline composition which comprises, as components, A) a liquid-crystalline mixture comprising as least one compound selected from the group consisting of the compounds of the formula Ia $$Z^1\text{—}Y^1\text{—}A^1\text{—}Y^3\text{—}M^1\text{—}Y^4\text{—}A^2\text{—}Y^2\text{—}Z^2 \qquad \text{Ia}$$

and of the formula Ib $$Z^3\text{—}Y^5\text{—}A^3\text{—}Y^7\text{—}M^2\text{—}P \qquad \text{Ib,}$$

where the variables, independently of one another, have the following meanings:

P is hydrogen, $C_1$–$C_{15}$-alkyl or a —$Y^8$—$A^4$—$Y^6$—$Z^4$ group, $Z^1$ to $Z^4$ are polymerizable groups, $Y^1$ to $Y^8$ are linking groups, $A^1$ to $A^4$ are spacers, $M^1$ and $M^2$ are mesogenic groups, B) if desired, further additives selected from the group consisting of
  b1) photoinitiators,
  b2) reactive thinners and
  b3) diluents, C) if desired, further additives taken from the group consisting of
  c1) antifoams and deaerators,
  c2) lubricants and flow auxiliaries
  c3) thermally curing or radiation-curing auxiliaries,
  c4) substrate wetting auxiliaries,
  c5) wetting and dispersion auxiliaries,
  c6) hydrophobicizing agents,
  c7) adhesion promoters and
  c8) auxiliaries for improving the scratch resistance, D) if desired, further additives selected from the group consisting of
  d1) dyes and
  d2) pigments
and E) if desired, further additives selected from the group consisting of light, heat and/or oxidation stabilizers.

A detailed definition of the variables $Z^1$ to $Z^4$, $Y^1$ to $Y^8$, $A^1$ to $A^4$, P, $M^1$ and $M^2$ is given in the following description.

The present invention furthermore relates to the use of a liquid-crystalline composition of this type as a printing ink, for printing or coating substrates, in electro-optical components, for counterfeiting-proof marking of articles and for the production of films or coatings which selectively reflect light in the wavelength range from 250 to 1300 nm.

The present invention furthermore relates to a polymer or polymerized film obtained by polymerizing a liquid-crystalline composition according to the current invention and to the use of a polymerized film of this type as an optical filter, polarizer, decoration, counterfeiting-proof marking or reflection medium for the selective reflection of radiation in the wavelength range of 250 to 1300 nm.

The present invention furthermore relates to a process for printing or coating the substrate using a liquid-crystalline composition according to the invention.

The present invention furthermore relates to substrates to which a liquid-crystalline composition according to the invention or a polymer or polymerized film according to the invention has been applied or which has been printed or coated by the process according to the invention.

The specification WO 96/02597 describes a process for coating or printing substrates with a coating or printing composition which comprises said liquid-crystalline, polymerizable monomers. The coating or printing composition comprises either a chiral liquid-crystalline monomer or an achiral liquid-crystalline monomer and a non-liquid-crystalline compound, and polymeric binders and/or monomeric compounds which can be converted into the polymeric binder by polymerization.

According to the examples given in this specification, these printing or coating compositions can be applied to various substrates by diverse application methods, for example by spraying or offset printing, where, after curing, for example by irradiation with UV light, they form strongly adhering layers which are resistant to external influences.

However, layers obtained in this way usually do not exhibit the desired degree of brilliance and brightness. Furthermore, the m printing and coating compositions described are not ideally suitable for printing, in particular in screen printing, clonographic printing and letterpress printing, inter alia owing to their viscosity, which is without exception high.

It is an object of the present invention to provide a liquid-crystalline composition which can be used, inter alia, as a printing ink in common printing methods and enables the production of prints having high color fastness, brilliance and whiteness and the production of homogeneous and smooth liquid-crystalline layers and films.

We have found that this object is achieved by the liquid-crystalline composition described at the outset, which, in addition to the optional components B) to E), comprises, as component A) a liquid-crystalline mixture comprising at least one compound selected from the group consisting of the compounds of the formula Ia $$Z^1\text{—}Y^1\text{—}A^1\text{—}Y^3\text{—}M^1\text{—}Y^4\text{—}A^2\text{—}Y^2\text{—}Z^2 \qquad \text{Ia}$$

and of the formula Ib $$Z^3\text{—}Y^5\text{—}A^3\text{—}Y^7\text{—}M^2\text{—}P \qquad \text{Ib,}$$

where the variables, independently of one another, have the following meanings:

$Z^1$ to $Z^4$ are polymerizable groups, $Y^1$ to $Y^8$ are each a single chemical bond, oxygen, sulfur, —O—CO—, —CO—O—, —O—CO—O—, —CO—NR—, —NR—CO—, —CO—NR—, —NR—CO—O— or —NR—CO—NR—, R is hydrogen or $C_1$–$C_4$-alkyl, $A^1$ to $A^4$ are spacers having 1 to 30 carbon atoms, in which the carbon chain may be interrupted by ether oxygen, thioether sulfur or by non-adjacent imino or $C_1$–$C_4$-alkylimino groups.

P is hydrogen, $C_1$–$C_{15}$-alkyl, which may be monosubstituted or polysubstituted by methyl, fluorine, chlorine or bromine and in which non-adjacent $CH_2$-groups may be replaced by oxygen, sulfur, —CO—, —O—CO—, —CO—O— or —O—CO—O—, or a —$Y^8$—$A^4$—$Y^6$—$Z^4$ group, where the variables are as defined above, $M^1$ is a mesogenic group of the formula Ic $$—T^1—Y^9—T^{1'}— \qquad \text{Ic,}$$

and $M^2$ is a mesogenic group of the formula Id $$(—T^2—Y^{10})_r—T^2— \qquad \text{Id,}$$

where the variables in the formulae Ic and Id, independently of one another, are as defined below:

$T^1$, $T^{1'}$ and $T^2$ are divalent saturated or unsaturated carbocyclic or heterocyclic radicals, $Y^9$ and $Y^{10}$ are bridging units as defined for $Y^1$ to $Y^8$ or $—CH_2—O—$, $—O—CH_2—$, $—CH=N—$, $—N=CH—$ or $—N=N—$, r is a value of 0, 1, 2 or 3, where the radicals $T^2$ and $Y^{10}$, in the case where r is not 0, may be identical or different.

Component A) of the novel liquid-crystalline composition covers both liquid-crystalline mixtures which comprise pure liquid-crystalline compounds of the formulae Ia and/or Ib and mixtures which additionally include non-liquid-crystalline mixture constituents, but overall have liquid-crystalline behavior. These non-liquid-crystalline mixture constituents are usually byproducts formed during synthesis of liquid-crystalline compounds or during synthesis of mixtures of the liquid-crystalline compounds.

Besides the liquid-crystalline compounds of the formulae Ia and/or Ib (and the byproducts), component A) preferably also comprises at least one chiral compound, which, however, need not necessarily itself have liquid-crystalline behavior. The presence of such chiral compounds results—at least within certain temperature ranges—in the formation of chiral-nematic (cholesteric) phases, which usually have interesting optical properties.

However, it should be pointed out that, for the purposes of the present invention, the liquid-crystalline composition or the liquid-crystalline mixtures (component A)) need not necessarily include such chiral compounds.

Suitable polymerizable groups $Z^1$ to $Z^4$ are—in combination with the bridging units $Y^1$ to $Y^8$— for example:

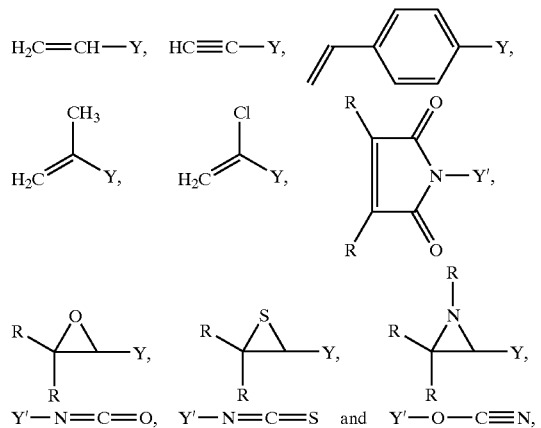

where Y is as defined for the bridging units $Y^1$ to $Y^8$, i.e. a single chemical bond, oxygen, sulfur, $—O—CO—$, $—CO—O—$, $—O—CO—O—$, $—CO—NR—$, $—NR—CO—$, $—O—CO—NR—$, $—NR—CO—O—$ or $—NR—CO—NR—$, and R is hydrogen or $C_1$–$C_4$-alkyl, i.e. methyl, ethyl, n-propyl, i-propyl, n-butyl, i-butyl, sec-butyl or tert-butyl, and Y' is a single chemical bond (hereinafter, the polymerizable groups $Z^1$ to $Z^4$ in combination with the bridging units $Y^1$ to $Y^8$ are referred to as polymerizable units or as Z—Y and/or Z—Y').

Of these polymerizable units, the cyanates can spontaneously trimerize to cyanurates. The maleimido group is particularly suitable for free-radical copolymerization with liquid-crystalline compounds of the formula Ia and/or Ib containing styryl groups as polymerizable units.

Compounds of the formula Ia and/or Ib containing epoxide, thiirane, aziridine, isocyanate and isothiocyanate groups require further compounds containing complementary reactive units for polymerization. Thus, for example, the corresponding isocyanates can be polymerized with alcohols to give urethanes and with amines to give urea derivatives. A similar situation applies to the corresponding thiiranes and aziridines.

The complementary reactive units may be present in the liquid-crystalline compounds, which are built up similarly to those of the formula Ia and/or Ib in component A) of liquid-crystalline composition. However, instead of the $Z^1—Y^1—$, $Z^2—Y^2—$, $Z^3—Y^5—$ and/or $Z^4—Y^6—$ groups, these compounds contain, for example, hydroxyl, mercapto or NHR groups, where, in the latter, R is hydrogen or, for example, $C_1$–$C_4$-alkyl. The complementary reactive units may also be present in auxiliary compounds introduced into the liquid-crystalline composition.

Depending on whether component A) comprises liquid-crystalline compounds of the formula Ib containing one or two polymerizable units and, if it does, depending on the proportion of these compounds, and depending, inter alia, on the mixing ratio of liquid-crystalline compounds containing polymerizable units with those containing complementary units or on the mixing ratio of liquid-crystalline compounds containing polymerizable units and auxiliary compounds containing complementary units, polymeric products are obtained with greatly different degrees of crosslinking, which are thus correspondingly matched to the particular requirements.

The spacers $A^1$ and $A^2$ usually contain from 1 to 30 carbon atoms, preferably from 1 to 12 carbon atoms, and consist of predominantly linear aliphatic groups. The carbon chain may in addition be monosubstituted or polysubstituted by methyl, fluorine, chlorine or bromine and/or interrupted by ether oxygen, thioether sulfur or by non-adjacent imino or $C_1$–$C_4$-alkylimino groups. Suitable $C_1$–$C_4$-alkyl radicals for the latter are methyl, ethyl, n-propyl, i-propyl, n-butyl, i-butyl, sec-butyl and tert-butyl.

Examples of representative spacers are the following:

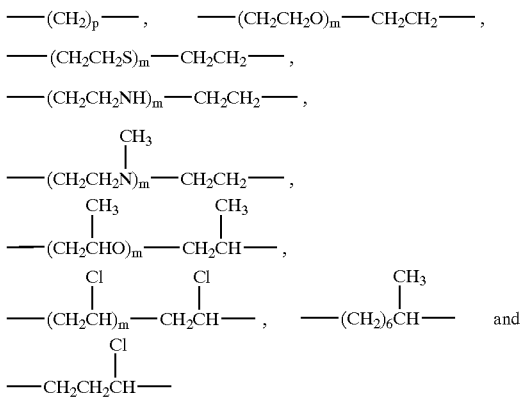

where p is an integer from 1 to 30, preferably 1, 2, 3, 4, 5, 6, 7, 8, 9, 10, 11 or 12, and m is an integer from 1 to 14, preferably 1, 2 or 3.

Suitable $C_1$–$C_{15}$-alkyl radicals for P are preferably unbranched alkyl chains, for example methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl or n-pentadecyl.

These $C_1$–$C_{15}$-alkyl radicals may be monosubstituted or polysubstituted, generally up to trisubstituted, by methyl, fluorine, chlorine or bromine. P is then, for example, i-propyl("1-methylethyl"), sec-butyl("1-methylpropyl"), i-butyl("2-methylpropyl"), tert-butyl("1,1-dimethylethyl"), 1-methylbutyl, 2-methylbutyl, 3-methylbutyl, 2,2-dimethylpropyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl or the mono- di- or tri-methyl-substituted radicals n-hexyl, n-heptyl, n-octyl, n-nonyl, n-decyl, n-undecyl, n-dodecyl, n-tridecyl, n-tetradecyl or n-pentadecyl and isomers thereof. Formal replacement of the methyl groups in the radicals mentioned by way of example by fluorine, chlorine or bromine gives the corresponding halogen-substituted $C_1$–$C_{15}$-alkyl radicals.

Non-adjacent $CH_2$ groups in $C_1$–$C_{15}$-alkyl may be replaced by oxygen, sulfur, —CO—, —O—CO—, —CO—O— or —O—CO—O—.

If this is the case, the $CH_2$ groups in the $C_1$–$C_{15}$-alkyl are preferably replaced by oxygen or sulfur.

If this is the case, up to four $CH_2$-groups in the $C_1$–$C_{15}$-alkyl are preferably replaced.

Suitable $C_1$–$C_{15}$-alkyl radicals for P in which $CH_2$-groups in the carbon chain have been replaced by ether oxygen are, for example, 2-methoxyethyl, 2-ethoxyethyl, 2-propoxyethyl, 2-butoxyethyl, 3-methoxypropyl, 3-ethoxypropyl, 3-butoxypropyl, 4-methoxybutyl, 4-ethoxybutyl, 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl and 3,6,9,12-tetraoxatetradecyl, and the corresponding sulfur analogs.

P can also be a —$Y^8$—$A^4$—$Y^6$—$Z^4$ group, in which the variables are as defined above.

$M^1$ corresponds to a mesogenic group of the formula Ic

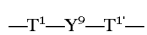         Ic, and $M^2$ corresponds to a mesogenic group of the formula Id

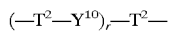         Id.

In the formulae Ic and Id, the variables, independently of one another, are as defined below:

$T^1$, $T^{1'}$ and $T^2$ are divalent saturated or unsaturated carbocyclic or heterocyclic radicals, $Y^9$ and $Y^{10}$ are bridging units as defined for $Y^1$ to $Y^8$ or —$CH_2$—O—, —O—$CH_2$—, —CH=N—, —N=CH— or —N=N— and r is 0, 1, 2 or 3.

In the case where r is 1, 2 or 3, the radicals $T^2$ and $Y^{10}$ may be identical or different.

r is preferably 1 or 2.

The mesogenic groups $M^1$ are thus "bicyclic" and the mesogenic groups $M^2$ are "monocyclic", "bicyclic", "tricyclic" or "tetracyclic", but preferably "bicyclic" or "tricyclic" units.

The radicals $T^1$, $T^{1'}$ and $T^2$ can, if possible, carry up to three identical or different substitutes selected from the group consisting of $C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy, $C_1$–$C_{20}$-alkylcarbonylamino, formyl, halogen, cyano, hydroxyl or nitro. In the case of substituted radicals $T^1$ and/or $T^{1'}$ and/or $T^2$, however, monosubstitution is preferred.

Particularly suitable radicals $T^1$, $T^{1'}$ and $T^2$ are the following

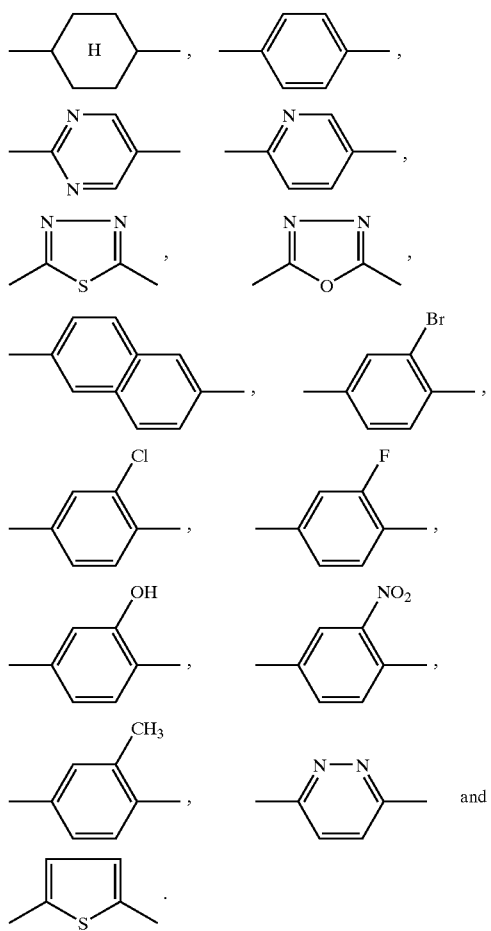

Preferred mesogenic groups $M^1$ are, for example:

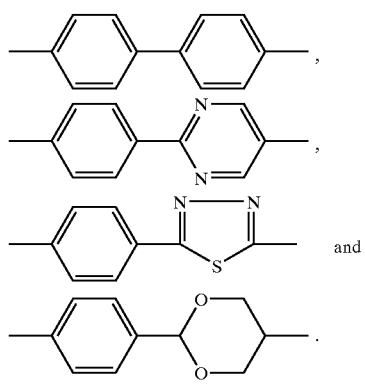

Preferred mesogenic groups M² are, for example:

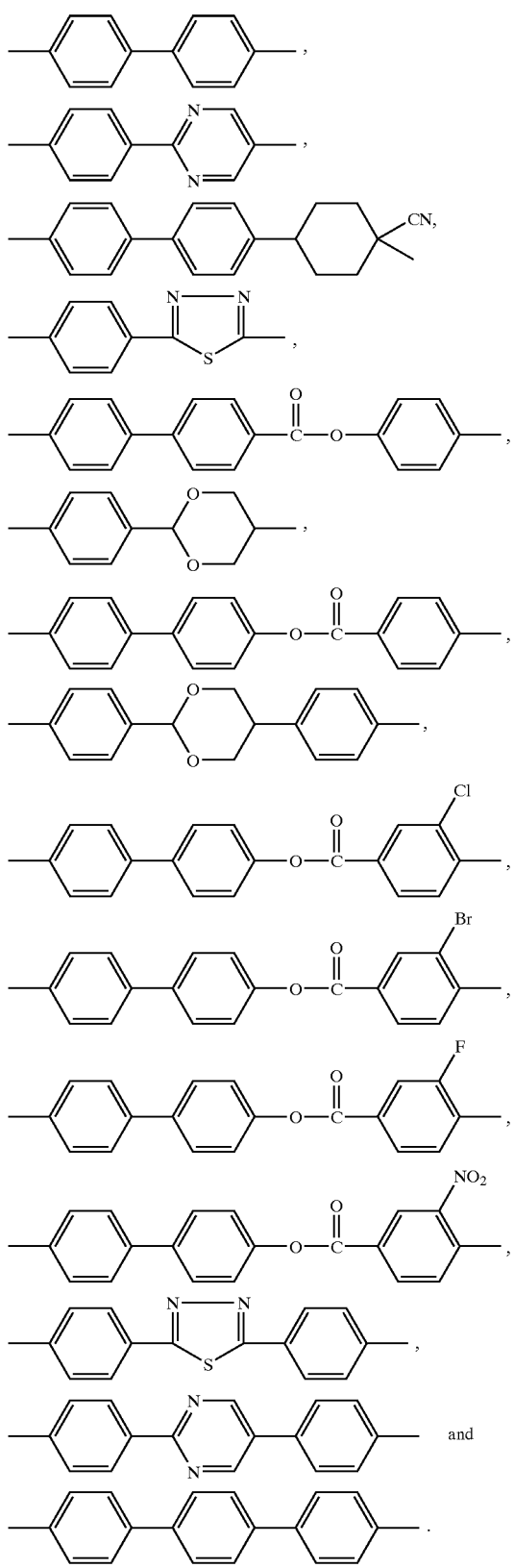

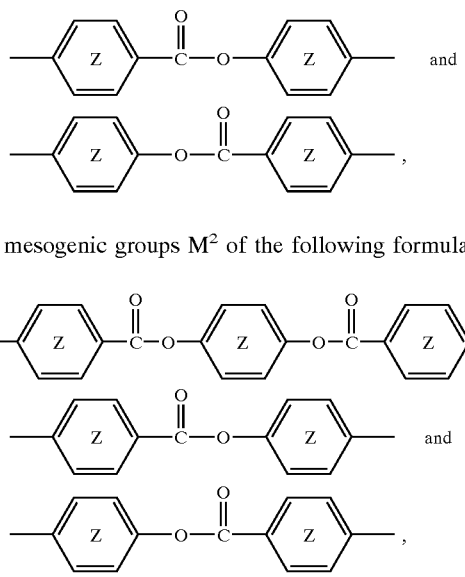

and mesogenic groups M² of the following formulae:

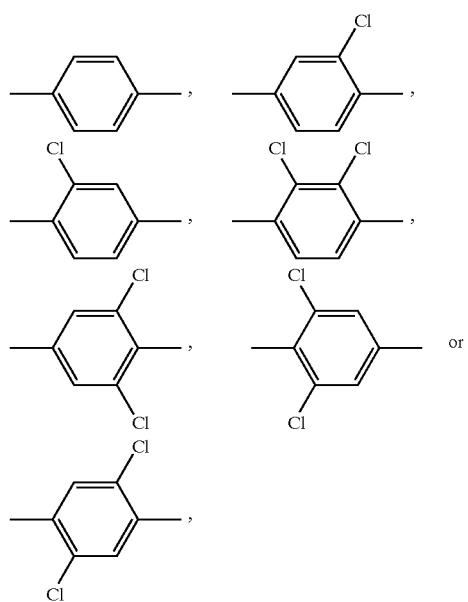

where each ring Z can carry up to three identical or different substituents selected from the group consisting of $C_1$–$C_{20}$-alkyl, $C_1$–$C_{20}$-alkoxy, $C_1$–$C_{20}$-alkoxycarbonyl, $C_1$–$C_{20}$-monoalkylaminocarbonyl, $C_1$–$C_{20}$-alkylcarbonyl, $C_1$–$C_{20}$-alkylcarbonyloxy, $C_1$–$C_{20}$-alkylcarbonylamino, formyl, halogen, cyano, hydroxyl or nitro.

Besides fluorine, chlorine, bromine, cyano, formyl and hydroxyl, preferred substituents for the aromatic rings Z are, in particular, short-chain aliphatic radicals, such as methyl, ethyl, n-propyl, i-propyl, n-butyl, i-butyl, tert-butyl, and alkoxy, alkoxycarbonyl, alkylcarbonyl, alkylcarbonyloxy, alkylcarbonylamino and monoalkylaminocarbonyl radicals containing these alkyl radicals.

The benzene rings Z in the particularly preferred groups M¹ and the outer benzene rings Z in the particularly preferred groups M² preferably have the following substitution pattern:

Particular preference is given to mesogenic groups M¹ of the following formulae:

or are substituted analogously by F, Br, $CH_3$, $OCH_3$, CHO, $COCH_3$, $OCOCH_3$ or CN instead of Cl, where a mixture of substituents may also be present. Mention should also be made of the structures

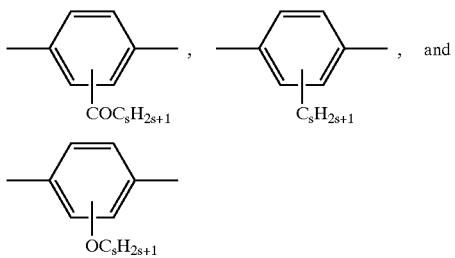

where s is an integer from 2 to 20, preferably 8, 9, 10, 11, 12, 13, 14 or 15.

The preferred substitution patterns of the central benzene rings Z in the particularly preferred groups $M^2$ are:

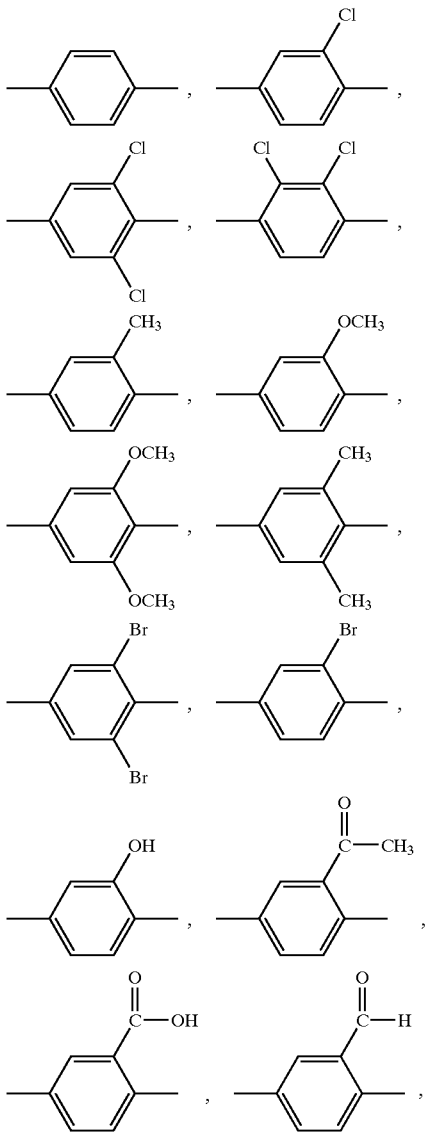

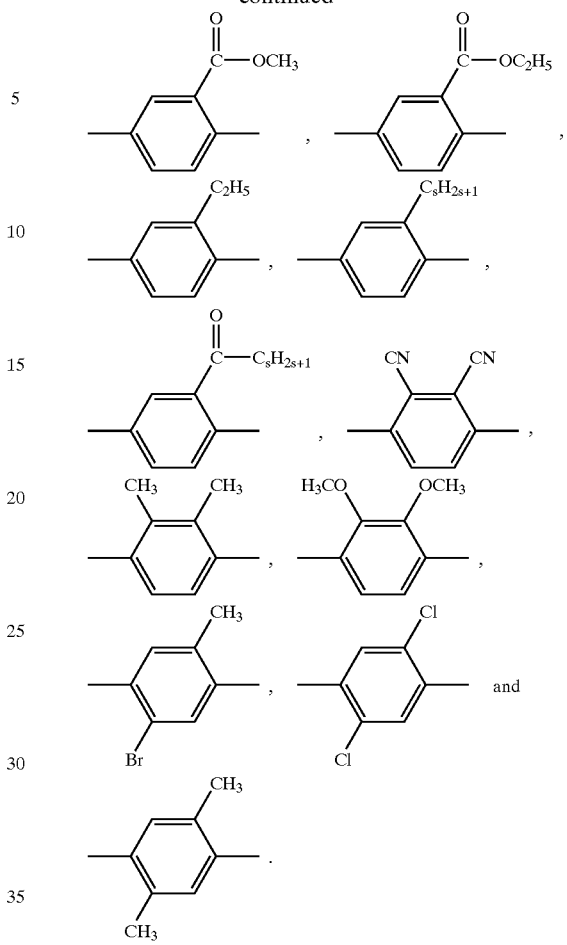

In the compounds of the formulae Ia and Ib, $Y^1$ to $Y^5$, $Y^7$, $Y^9$ and $Y^{10}$, and, if present, $Y^6$ and $Y^8$ are preferably independently of one another oxygen, —O—CO—, —CO—O— or —O—CO—O—.

Preferred liquid-crystalline compositions comprise, as component A), a liquid-crystalline mixture which comprises at least one compound of the above formula Ia and at least one compound of the above formula Ib.

The liquid-crystalline compositions and their preferred embodiments preferably comprise compounds of the formulae Ia and/or Ib, in which the polymerizable units $Z^1$—$Y^1$—, $Z^2$—$Y^2$—, $Z^3$—$Y^5$— and, if present, $Z^4$—$Y^6$— are selected from the group consisting of methacryloyloxy, acryloyloxy and vinyloxy.

Preference is furthermore given to liquid-crystalline compositions according to the invention and their preferences which have a viscosity of from 0.5 to 10.0 Pa.s at 20° C.

The viscosity values here are taken to be flow viscosity values determined in cone-and-plate geometry.

The viscosities can be determined, for example, using a Rheometrics Dynamic Spectrometer.

Further liquid-crystalline compounds which conform to the formulas Ia and Ib and may be present in component A) are given in the specification WO 97/00600 and WO 98/47979 and the earlier German patent application 197 35 829.3

Component A) of the liquid-crystalline compositions and their preferred embodiments preferably contains from 40 to 99.5% by weight, based on the total amount of component A), of the compounds of the formulae Ia and/or Ib.

If the chiral compounds are present in the liquid-crystalline mixture (component A)), they preferably conform to the formulae Ie, If, Ig and Ih:

$(Z^5-Y^{11})_n X$  Ie, $(Z^5-Y^{11}-A^5-Y^{12})_n X$  If, $(Z^5-Y^{11})_n X$  Ig, $(Z^{11}-Y^{11}-A^5-Y^{12}-M-Y^{13})_n X$  Ih, in which the variables $Z^5$ are polymerizable groups, $Y^{11}$ to $Y^{13}$ are bridging units, $A^5$ are spacers and M are mesogenic groups and which have the same general meaning as the variables $Z^1$ to $Z^4$, $Y^1$ to $Y^8$, $A^1$ to $A^4$ and $M^1$ and $M^2$ in the formulae Ia and Ib (and for M in the formulae Ic and Id). n is 1, 2, 3, 4, 5 or 6 and X is an n-valent chiral radical. The n groups bonded to the chiral radical X may be identical or different here.

Corresponding radicals X are, for example:

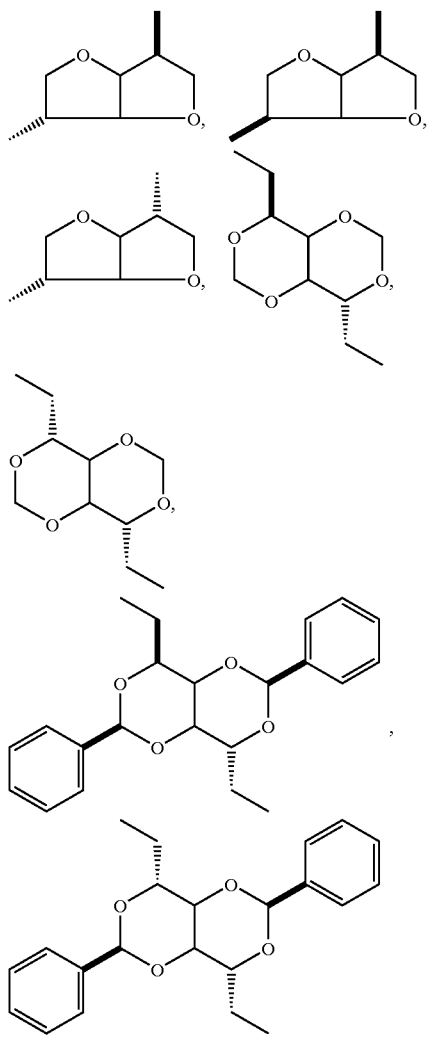

-continued

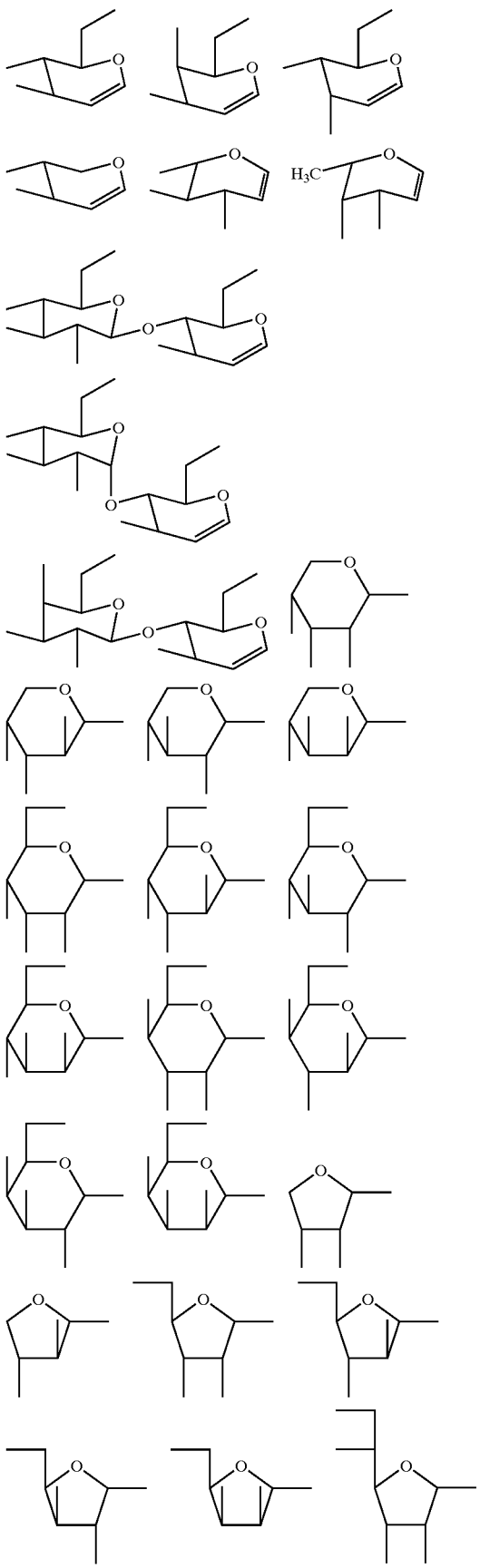

-continued

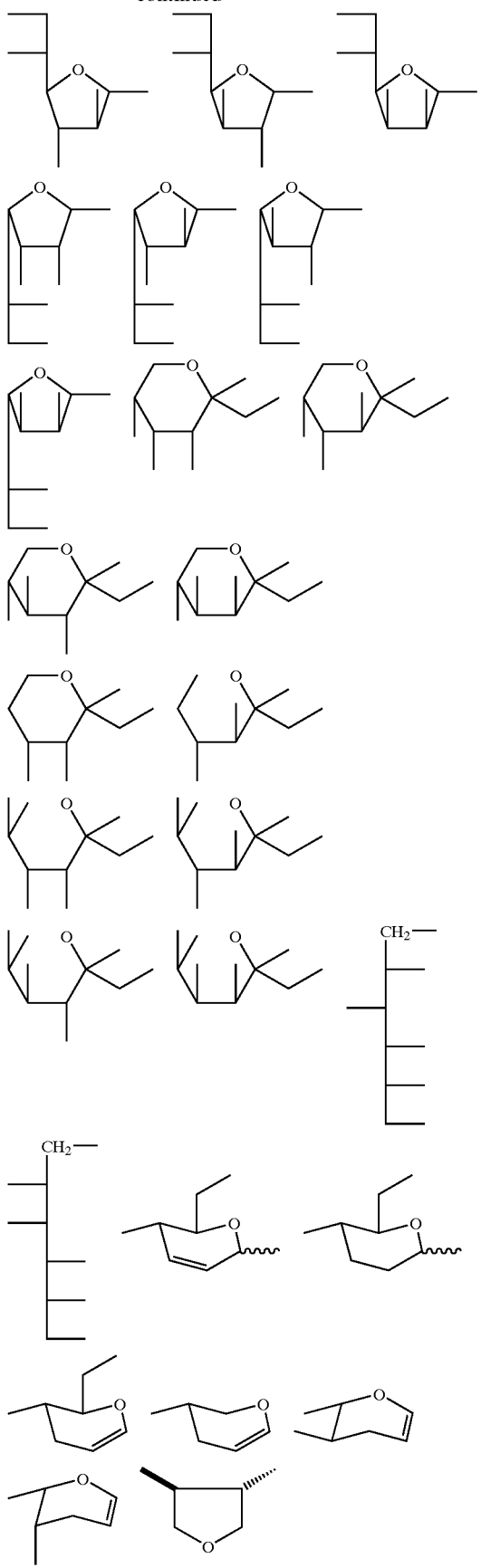

-continued

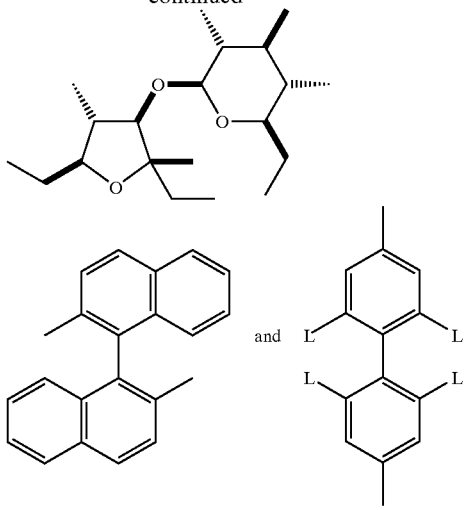

where
L is R, RO, COOR, OCOR, CONHR or NHCOR, halogen, in particular fluorine, chlorine or bromine, and R is $C_1$–$C_4$-alkyl, for example methyl, ethyl, n-propyl, i-propyl, n-butyl, i-butyl, or tert-butyl.

Particular preference is given to the following:

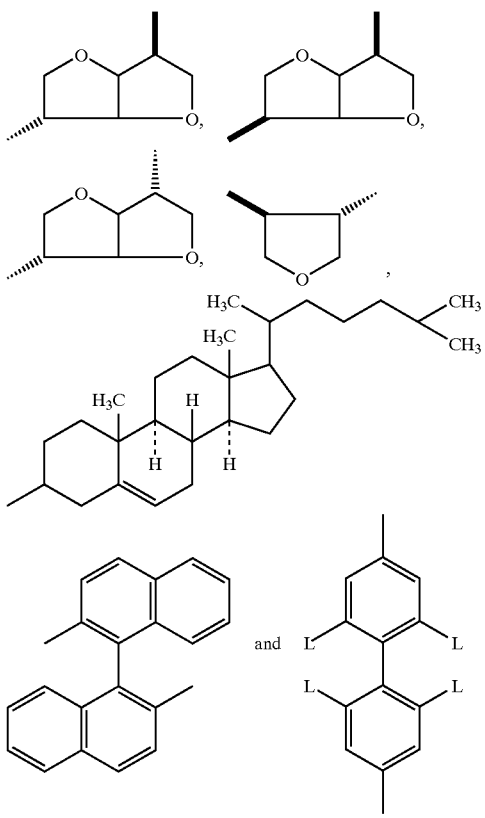

Chiral compounds containing these and further suitable chiral radicals are mentioned, for example, in the specifications WO 95/16007, DE-A 1 95 20 660, DE-A 1 95 20 704 and the earlier German patent application 198 43 724.2.

The liquid-crystalline compositions according to the invention may contain further additives listed under components B) to E).

Besides component A) and its corresponding preferences, preferred compositions according to the invention also comprise component B), which comprises at least one photoinitiator (b1)), at least one reactive thinner (b2)) containing photopolymerizable groups, and, if desired, diluents (b3)), and, if desired, further additives selected from the group consisting of components C), D) and E).

Besides component A) and its corresponding preferences, further preferred compositions according to the invention also comprise component C) and, if desired, further additives selected from the group consisting of components B), D) and E).

Besides component A) and its corresponding preferences, further preferred compositions according to the invention also comprise component B), which comprises at least one photoinitiator (b1)), at least one reactive thinner (b2)) containing photopolymerizable groups and, if desired, diluents (b3)), and component C), and, if desired, further additives selected from the group consisting of components D) and E).

Examples of suitable photoinitiators (b1)) are the substances which are commercially available under the tradenames Lucirin®, Irgacure® and Darocure®. Preference is given to the initiators Lucirin® TPO, Irgacure® 184, Irgacure® 369, Irgacure® 907 and Darocure® 1173.

The photoinitiators are usually employed in a proportion of from 0.5 to 5.0% by weight, based on the total weight of the liquid-crystalline composition.

The reactive thinners (b2)) used are not only substances which are referred to in the actual sense as reactive thinners (group b2.1)), but also auxiliary compounds already mentioned above which contain one or more complementary reactive units, for example hydroxyl or amino groups, via which a reaction with the polymerizable units of the liquid-crystalline compounds can take place (group b2.2)).

The substances in group b2.1) which are usually capable of photopolymerization include, for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid acid adipic acid, allyl and vinyl ethers and methacrylic and acrylic esters of monofunctional alcohols, for example of lauryl, myristyl, palmityl and stearyl alcohol, and diallyl and divinyl ethers of bifunctional alcohols, for example ethylene glycol and 1,4-butanediol.

Also suitable are, for example, methacrylic and acrylic esters of polyfunctional alcohols, in particular those which contain no further functional groups, or at most ether groups, besides the hydroxyl groups. Examples of such alcohols are bifunctional alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated and propoxylated bisphenols, cyclohexanedimethanol, trifunctional and polyfunctional alcohols, such as glycerol, trimethylolpropane, butanetriol, trimethylolethane, pentaerythritol, ditrimethylolpropane, dipentaerythritol, sorbitol, mannitol, and the corresponding alkoxylated, in particular ethoxylated and propoxylated alcohols.

Other suitable reactive thinners from group b2.1) are polyester (meth)acrylates, which are the (meth)acrylic ester of polyesterols.

Examples of suitable polyesterols are those which can be prepared by esterification of polycarboxylic acids, preferably dicarboxylic acids, using polyols, preferably diols. The starting materials for such hydroxyl-containing polyesters are known to the person skilled in the art. Dicarboxylic acids which can be employed are succinic, glutaric acid, adipic acid, sebacic acid, o-phthalic acid and isomers and hydrogenation products thereof, and esterifiable and transesterifiable derivatives of said acids, for example anhydrides and dialkyl esters. Suitable polyols are the abovementioned alcohols, preferably ethyleneglycol, 1,2- and 1,3-propylene glycol, 1,4-butanediol, 1,6-hexanediol, neopentyl glycol, cyclohexanedimethanol and polyglycols of the ethylene glycol and propylene glycol type.

Suitable reactive thinners from group b2.1) are furthermore 1,4-divinylbenzene, triallyl cyanurate, acrylic esters of tricyclodecenyl alcohol of the following formula

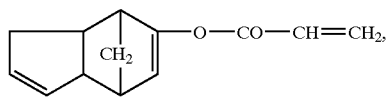

also known under the name dihydrodicyclopentadienyl acrylate, and the allyl esters of acrylic acid, methacrylic acid and cyanoacrylic acid.

Of the reactive thinners from group b2.1) which are mentioned by way of example, those containing photopolymerizable groups are used in particular and in view of the abovementioned preferred compositions.

Group b2.2) includes, for example, dihydric and polyhydric alcohols, for example ethylene glycol, propylene glycol and more highly condensed representatives thereof, for example diethylene glycol, triethylene glycol, dipropylene glycol, tripropylene glycol etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, in particular ethoxylated and propoxylated alcohols.

Group b2.2) furthermore also includes, for example, alkoxylated phenolic compounds, for example ethoxylated and propoxylated bisphenols.

These reactive thinners may furthermore be, for example, epoxide or urethane (meth)acrylates.

Epoxide (meth)acrylates are, for example, those as obtainable by the reaction, known to the person skilled in the art, of epoxidized olefins or poly- or diglycidyl ether, such as bisphenol A diglycidyl ether, with (meth)acrylic acid.

Urethane (meth)acrylates are, in particular, the products of a reaction, likewise known to the person skilled in the art, of hydroxylalkyl (meth)acrylates with poly- or diisocyanates.

Such epoxide and urethane (meth)acrylates are included amongst the compounds listed under groups b2.1) and b2.2) as "mixed forms".

If reactive thinners are used, their amount and properties must be matched to the respective conditions in such a way that, on the one hand, a satisfactory desired effect, for example the desired color of the composition according to the invention, is achieved, but, on the other hand, the phase behavior of the liquid-crystalline composition is not excessively impaired. The low-crosslinking (high-crosslinking) liquid-crystalline compositions can be prepared, for example, using corresponding reactive thinners which have a relatively low (high) number of reactive units per molecule.

The reactive thinners are usually employed in a proportion of from about 0.5 to 20.0% by weight, based on the total weight of the liquid-crystalline composition.

It should be mentioned here that liquid-crystalline mixtures (component A)) which have a relatively high (low) content of compounds of the formula Ib containing radicals P which are not capable of polymerization may of course also be used in addition (or alternatively) for the preparation of low-crosslinking (high-crosslinking) liquid-crystalline compositions.

Group b3) of diluents include, for example:

$C_1$–$C_4$-alcohols, for example methanol, ethanol, n-propanol, isopropanol, butanol, isobutanol, sec-butanol and, in particular, the $C_5$–$C_{12}$-alcohols n-pentanol, n-hexanol, n-heptanol, n-octanol, n-nonanol, n-decanol, n-undecanol and n-dodecanol, and isomers thereof, glycols, for example 1,2-ethylene glycol, 1,2- and 1,3-propylene glycol, 1,2-, 2,3- and 1,4-butylene glycol, di- and triethylene glycol and di- and tripropylene glycol, ethers, for example methyl tert-butyl ether, 1,2-ethylene glycol mono- and dimethyl ether, 1,2-ethylene glycol mono- and -diethylether, 3-methoxypropanol, 3-isopropoxypropanol, tetrahydrofuran and dioxane, ketones, for example acetone, methyl ethyl ketone, methyl isobutyl ketone and diacetone alcohol (4-hydroxy-4-methyl-2-pentanone), $C_1$–$C_5$-alkyl esters, for example methyl acetate, ethyl acetate, propyl acetate, butyl acetate and amyl acetate, aliphatic and aromatic hydrocarbons, for example pentane, hexane, heptane, octane, isooctane, petroleum ether, toluene, xylene, ethylbenzene, tetralin, decalin, dimethylnaphthalene, white spirit, Shellsol® and Solvesso® mineral oils, for example gasoline, kerosine, diesel oil and heating oil, but also natural oils, for example olive oil, soya oil, rapeseed oil, linseed oil and sunflower oil.

It is of course also possible to use mixtures of these diluents in the compositions according to the invention.

So long as there is at least partial miscibility, these diluents can also be mixed with water. Examples of suitable diluents here are $C_1$–$C_4$-alcohols, for example methanol, ethanol, n-propanol, isopropanol, butanol, isobutanol and sec-butanol, glycols, for example 1,2-ethylene glycol, 1,2- and 1,3-propylene glycol, 1,2-, 2,3- and 1,4-butylene glycol, di- and triethylene glycol, and di- and tripropylene glycol, ethers, for example tetrahydrofuran and dioxane, ketones, for example acetone, methyl ethyl ketone and diacetone alcohol (4-hydroxy-4-methyl-2-pentanone), and $C_1$–$C_4$-alkyl esters, for example methyl, ethyl, propyl and butyl acetate.

Water-containing mixtures of this type frequently have limited miscibility with non-polar diluents, for example the abovementioned aliphatic and aromatic hydrocarbons, mineral oils, but also natural oils, which then means that ternary (or quasi-ternary) diluents can be prepared from water, at least partially water-miscible diluents and water-immiscible diluents, and can be used.

The diluents are usually employed in a proportion of from about 0.5 to 10.0% by weight, preferably from about 1.0 to 5.0% by weight, based on the total weight of the liquid-crystalline composition.

The antifoams and deaerators (c1)), lubricants and flow auxiliaries (c2)), thermally curing or radiation-curing auxiliaries (c3)), substrate wetting auxiliaries (c4)), wetting and dispersion auxiliaries (c5)), hydrophobicizing agents (c6)), adhesion promoters (c7)) and auxiliaries for promoting scratch resistance (c8)) which are listed under component C) usually cannot strictly be delimited from one another in their action. For example, lubricants and flow auxiliaries often also act as antifoams and/or deaerators and/or as auxiliaries for improving scratch resistance. Radiation-curing auxiliaries can also act as lubricants and flow auxiliaries and/or deaerators and/or as substrate wetting auxiliaries. In individual cases, some of these auxiliaries can also fulfill the function of an adhesion promoter (c8)).

Corresponding to the above-said, a certain additive can therefore be classified in a number of the groups c1) to c8) described below.

The antifoams in group c1) include silicon-free and silicon-containing polymers. The silicon-containing polymers are, for example, unmodified or modified polydialkylsiloxanes or branched copolymers, comb or block copolymers comprising polydialkylsiloxane and polyether units, the latter being obtainable from ethylene oxide or propylene oxide.

The deaerators in group c1) include, for example, organic polymers, for example polyethers and polyacrylates, dialkylpolysiloxanes, in particular dimethylpolysiloxanes, organically modified polysiloxanes, for example arylalkyl-modified polysiloxanes, and fluorosilicones.

The action of the antifoams is essentially based on preventing foam formation or destroying foam that has already formed. Antifoams essentially work by promoting coalescence of finely divided gas or air bubbles to give larger bubbles in the medium to be deaerated, for example the compositions according to the invention, and thus accelerate escape of the gas (of the air). Since antifoams can frequently also be employed as deaerators and vice versa, these additives have been included together under group c1).

Such auxiliaries are, for example, commercially available from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18,TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 960, Tego® Airex 970, Tego® Airex 980 and Tego® Airex 985 and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-066, BYK®-070, BYK®-080, BYK®-088, BYK®-141 and BYK®-A 530.

The auxiliaries in group c1) are usually employed in a proportion of from about 0.05 to 3.0% by weight, preferably from about 0.5 to 2.0% by weight, based on the total weight of the liquid-crystalline composition.

In group c2), the lubricants and flow auxiliaries typically include silicon-free, but also silicon-containing polymers, for example polyacrylates or modifiers, low-molecular-weight polydialkylsiloxanes. The modification consists in some of the alkyl groups having been replaced by a wide variety of organic radicals. These organic radicals are, for example, polyethers, polyesters or even long-chain alkyl radicals, the former being used the most frequently.

The polyether radicals in the correspondingly modified polysiloxanes are usually built up from ethylene oxide and/or propylene oxide units. Generally, the higher the proportion of these alkylene oxide units in the modified polysiloxane, the more hydrophilic is the resultant product.

Such auxiliaries are, for example, commercially available from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (can also be used as antifoam and deaerator), TEGO® Flow ATF, TEGO® Flow 300, TEGO® Flow 460, TEGO® Flow 425 and TEGO® Flow ZFS 460. Suitable radiation-curable lubricants and flow auxiliaries, which can also be used to improve the scratch resistance, are the products TEGO® Rad 2100, TEGO® Rad 2200, TEGO® Rad 2500, TEGO® Rad 2600 and TEGC Rad 2700, which are likewise obtainable from TEGO.

Such-auxiliaries are available, for example, from BYK as BYK®-300 BYK®-306, BYK®-307, BYK®-310, BYK®-320, BYK®-333, BYK®-341, Byk® 354 and Byk®361.

The auxiliaries in group c2) are usually employed in a proportion of from about 0.05 to 3.0% by weight, preferably from about 0.5 to 2.0% by weight, based on the total weight of the liquid-crystalline composition.

In group c3), the radiation-curing auxiliaries include, in particular, polysiloxanes having terminal double bonds which are, for example, a constituent of an acrylate group. Such auxiliaries can be crosslinked by actinic or, for example, electron radiation. These auxiliaries generally combine a number of properties together. In the uncrosslinked state, they can act as antifoams, deaerators, lubricants and flow auxiliaries and/or substrate wetting auxiliaries, while, in the crosslinked state, they increase, in particular, the scratch resistance, for example of coatings or films which can be produced using the compositions according to the invention. The improvement in the gloss properties, for example of precisely those coatings or films, is regarded essentially as a consequence of the action of these auxiliaries as antifoams, deaerators and/or lubricants and flow auxiliaries (in the uncrosslinked state).

Examples of suitable radiation-curing auxiliaries are the products TEGO® Rad 2100, TEGO® Rad 2200, TEGO® Rad 2500, TEGO® Rad 2600 and TEGO® Rad 2700 available from TEGO and the product BYK®-371 available from BYK.

Thermally curing auxiliaries in group c3) contain, for example, primary OH groups which are able to react with isocyanate groups, for example of the binder.

Examples of thermally curing auxiliaries which can be used are the products BYK®-370, BYK®-373 and BYK®-375 available from BYK.

The auxiliaries in group c3) are usually employed in a proportion of from about 0.1 to 5.0% by weight, preferably from about 0.1 to 3.0% by weight, based on the total weight of the liquid-crystalline composition.

The substrate wetting auxiliaries in group c4) serve, in particular, to increase the wettability of the substrate to be printed or coated, for example, by printing inks or coating compositions, for example compositions according to the invention. The generally attendant improvement in the lubricant and flow behavior of such printing inks or coating compositions has an effect on the appearance of the finished (for example crosslinked) print or coating.

A wide variety of such auxiliaries are commercially available, for example from Tego as TEGO® Wet KL 245, TEGO® Wet 250, TEGO® Wet 260 and TEGO® Wet ZFS 453 and from BYK as BYK®-306, BYK®-307, BYK®-310, BYK®-333, BYK®-344, BYK®-345, BYK®-346 and Byk®-348.

The auxiliaries in group c4) are usually employed in a proportion of from about 0.05 to 3.0% by weight, preferably from about 0.1 to 1.5% by weight, based on the total weight of the liquid-crystalline composition.

The wetting and dispersion auxiliaries in group c5) serve, in particular, to prevent the flooding and floating and the sedimentation of pigments and are therefore, if necessary, suitable in particular in pigmented compositions according to the invention.

These auxiliaries stabilize pigment dispersions essentially through electrostatic repulsion and/or steric hindrance of the pigment particles containing these additives, where, in the latter case, the interaction of the auxiliary with the ambient medium (for example binder) plays a major role.

Since the use of such wetting and dispersion auxiliaries is common practice, for example in the technical area of printing inks and paints, the selection of a suitable auxiliary of this type generally does not present the person skilled in the art with any difficulties, if they are used.

Such wetting and dispersion auxiliaries are commercially available, for example from Tego, as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W and from BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra®-206, BYK®-151, BYK®-154, BYK®-155, BYK®-P 104 S, BYK®-P 105, Lactimon®, Lactimon®-WS and Bykumen®.

The amount of the auxiliaries in group c5) used depends principally on the pigment surface area to be coated and on the mean molecular weight of the auxiliary.

For inorganic pigments and low-molecular-weight auxiliaries, a proportion of the latter of from about 0.5 to 2.0% by weight, based on the total weight of pigment and auxiliary, is usually expected. In the case of high-molecular-weight auxiliaries, the proportion increases to from about 1.0 to 30% by weight.

In the case of organic pigments and low-molecular-weight auxiliaries, the proportion of the latter is from about 1.0 to 5.0% by weight, based on the total weight of pigment and auxiliary. In the case of high-molecular-weight auxiliaries, this proportion can be between about 10.0 and 90% by weight.

In any case, a preliminary experiment is therefore advisable, but this can be accomplished simply by the person skilled in the art.

The hydrophobicizing agents in group c6) can be used to give water-repellent properties to prints or coatings produced, for example, using compositions according to the invention. This prevents or at least greatly suppresses swelling due to water absorption and thus a change in, for example, the optical properties of such prints or coatings. In addition, when the composition is used, for example, as a printing ink in offset printing, water absorption can thereby be prevented or at least greatly reduced.

Such hydrophobicizing agents are commercially available, for example, from Tego as Tego® Phobe WF, Tego® Phobe 1000, Tego® Phobe 1000 S, Tego® Phobe 1010, Tego® Phobe 1030, Tego® Phobe 1010, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries in group c6) are usually employed in a proportion of from about 0.05 to 5.0% by weight, preferably from about 0.1 to 3.0% by weight, based on the total weight of the liquid-crystalline composition.

Adhesion promoters from group c7) serve to improve the adhesion of two interfaces in contact. It is directly evident from this that essentially the only fraction of the adhesion promoter that is effective is that located at one or the other or at both interfaces. If, for example, it is desired to apply liquid or pasty printing inks, coating compositions or paints to a solid substrate, this generally means that the adhesion promoter must be added directly to the latter or the substrate must be pretreated with the adhesion promoters (also known as priming), i.e. this substrate is given modified chemical and/or physical surface properties.

If the substrate has previously been primed with a primer, this means that the interfaces in contact are that of the primer on the one hand and of the printing ink or coating composition or paint on the other hand. In this case, not only the adhesion properties between the substrate and the primer, but also between the substrate and the printing ink or coating composition or paint play a part in adhesion of the overall multilayer structure on the substrate.

Adhesion promoters in the broader sense which may be mentioned are also the substrate wetting auxiliaries already listed under group c4), but these generally do not have the same adhesion promotion capacity.

In view of the widely varying physical and chemical natures of substrates and of printing inks, coating compositions and paints intended, for example, for their printing or coating, the multiplicity of adhesion promoter systems is not surprising.

Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane and vinyltrimethoxysilane. These and other silanes are commercially available from Hüls, for example under the tradename DYNASILAN®.

Adhesion promoters based on titanates/zirconates and titanium zirconium bisacetylacetonates conform, for example, to the following formulae:

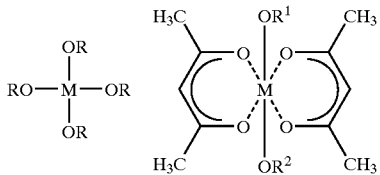

in which M is titanium or zirconium, and R, $R^1$ and $R^2$ are $C_1$–$C_4$-alkyl, for example i-propyl or n-butyl. Examples of such compounds are tetra-i-propyl titanate, tetra-n-butyl titanate, titanium bis(acetylacetonate)diisopropoxide, titanium bis(acetylacetonate)dibutoxide, titanium bis (acetylacetonate)monobutoxide monoisopropoxide and titanium bis(acetylacetonate)monoethoxide monoisopropoxide.

Other titanium and zirconium compounds which can be used as adhesion promoters are n-butyl polytitanate, isopropyl triisostearoyl titanate, isopropyl tris(N-ethylaminoethylamino)titanate and zirconium bis(diethyl citrate)diisopropoxide.

These and other titanium and zirconium compounds are available, for example, under the tradenames TYZOR® (DuPont), Ken-React® (Kenrich Petrochemicals Inc.) and Tilcom® (Tioxide Chemicals).

Zirconium aluminates, as available, for example, under the tradename Manchem® (Rhône Poulenc), can also serve as adhesion promoters.

Other compounds which are suitable, for example, as adhesion-promoting additives in printing inks or paints are chlorinated polyolefins (available, for example, from Eastman Chemical and Toyo Kasei), polyesters (available, for example, from Hüls AG, BASF Aktiengesellschaft, Gebr. Borchers AG, Pluess-Staufer AG, Hoechst AG and Worlee), compounds based on sucrose, for example sucrose benzoate and sucrose acetoisobutyrate (the latter available, for example, from Eastman Chemical), phosphoric acid esters (available, for example, from The Lubrizol Company and Hoechst AG) and polyethyleneimines (available, for example, from BASF Aktiengesellschaft), and compounds which are suitable, for example, as adhesion-promoting additives in printing inks for flexographic, film and packaging printing, colophonium ester (available, for example, from Robert Kraemer GmbH).

The usual procedure is, for example, appropriately to pre-treat the substrate to be printed or coated, i.e. to use such additives as primers.

Corresponding technical information from the manufacturers of such additives should generally be used or the person skilled in the art can obtain this information in a simple manner through corresponding preliminary experiments.

However, if these additives are to be added as auxiliaries from group c7) to the compositions according to the invention, their proportion usually corresponds to from about 0.05 to 5.0% by weight, based on the total weight of the liquid-crystalline composition. These concentration data serve merely as guidance, since the amount and identity of the additive are determined in each individual case by the nature of the substrate and of the printing/coating composition. Corresponding technical information is usually available from the manufacturers of such additives for this case or can be determined in a simple manner by the person skilled in the art through corresponding preliminary experiments.

The auxiliaries for improving the scratch resistance in group c8) include, for example, the abovementioned products TEGO® Rad 2100, TEGO® Rad 2200, TEGO® Rad 2500, TEGO® Rad 2600 and TEGO® Rad 2700, which are available from Tego.

For these auxiliaries, the amount data given for group c3) are likewise suitable, i.e. these additives are usually employed in a proportion of from about 0.1 to 5.0% by weight, preferably from about 0.1 to 3.0% by weight, based on the total weight of the liquid-crystalline composition.

The dyes in group d1) include, for example, dyes from the class of the monoazo dyes, isoindoline derivatives, derivatives of naphthalene- or perylenetetracarboxylic acid, thioindigo derivatives, azomethine derivatives, quinacridones, dioxazines, pyrazoloquinazzolones and basic dyes, such as triarylmethane dyes and their salts.

It is also possible, in particular, to add photochromic, thermochromic or luminescent dyes and dyes which have a combination of these properties to the compositions according to the invention. Besides typical fluorescent dyes, the term fluorescent dyes is also taken to mean optical brighteners.

The latter belong, for example, to the class of the bisstyrylbenzenes, in particular the cyanostyryl compounds, and conform to the formula

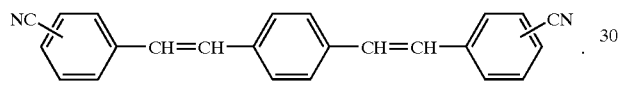

Further suitable optical brighteners from the class of the stilbenes have, for example, the formulae

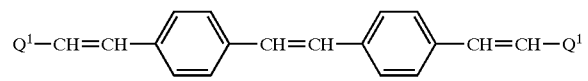

and

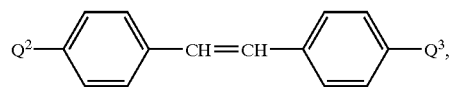

in which $Q^1$ is in each case $C_1$–$C_4$-alkoxycarbonyl or cyano, $Q^2$ is benzoxazol-2-yl, which may be monosubstituted or disubstituted by $C_1$–$C_4$-alkyl, in particular methyl, $Q^3$ is $C_1$–$C_4$-alkoxycarbonyl or 3-($C_1$–$C_4$-alkyl)-1,2,4-oxadiazol-3-yl.

Further suitable optical brighteners from the class of the benzoxazoles conform, for example, to the formulae

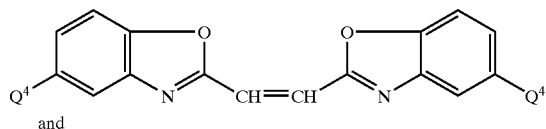

and

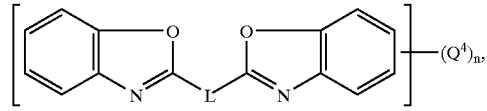

in which $Q^4$ is in each case $C_1$–$C_4$-alkyl, in particular methyl, L is a radical of the formula

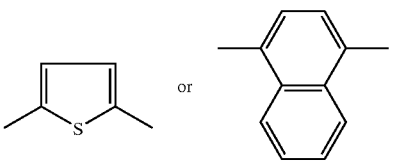

and n is an integer from 0 to 2.

Suitable optical brighteners from the class of the coumarines have, for example, the formula

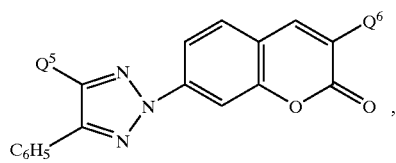

where $Q^5$ is $C_1$–$C_4$-alkyl, and $Q^6$ is phenyl or 3-halopyrazol-1-yl, in particular 3-chloropyrazol-1-yl.

Further suitable optical brighteners from the class of the pyrenes conform, for example, to the formula

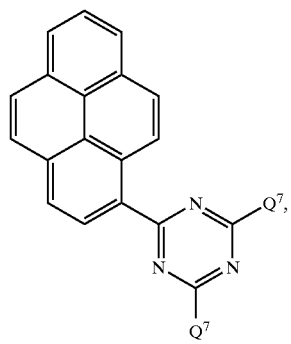

where $Q^7$ is in each case $C_1$–$C_4$-alkoxy, in particular methoxy.

The abovementioned brighteners can be used either alone or in mixtures with one another.

The abovementioned optical brighteners are generally known and commercially available products. They are described, for example, in Ullmann's Encyclopedia of Industrial Chemistry, 5th Edition, Volume A18, pages 156 to 161, or can be obtained by the methods given therein.

In particular, use is made, if this is desired, of one or more optical brighteners from the class of the bisstyrylbenzenes, in particular the cyanostyrylbenzenes.

The latter can be used as individual compounds, but also as a mixture of the isomeric compounds.

The isomers conform to the formulae

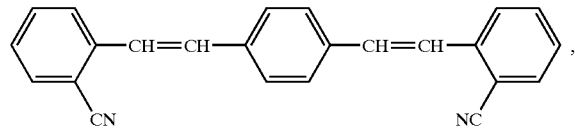

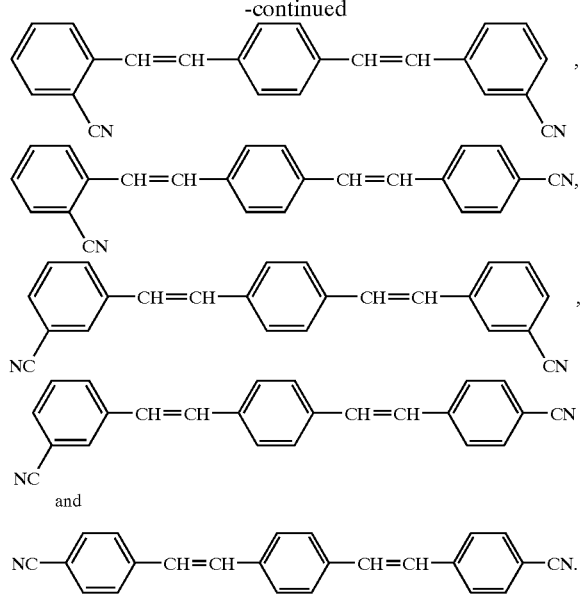

Optical brighteners are marketed commercially, for example, as Ultraphor® SF 004, Ultraphor® SF MO, Ultraphor® SF MP and Ultraphor® SF PO by BASF.

Suitable fluorescent dyes are, for example, perylene derivatives described in DE-A 32 35 526, DE-A 34 00 991, DE-A 34 34 059 and DE-A 35 45 004, European Patent Application 0 033 079 and European Patent 0 055 363.

Fluorescent dyes are marketed, for example, as Lumogen® Yellow 083, Lumogen® Orange 240, Lumogen® Red 300, Lumogen® Violet 570 and Thermoplast® F Yellow 084 by BASF.

The pigments in group d2) include both inorganic and organic pigments. An overview of inorganic colored pigments which can be used in compositions according to the invention is given by the book by H. Endriβ "Aktuelle anorganische Bunt-Pigmente" (Editor U. Zorll, Curt-R.-Vincentz-Verlag Hannover (1997)). In addition, further pigments not listed in the abovementioned book are Pigment Black 6 and Pigment Black 7 (carbon black), Pigment Black 11 (iron oxide black, $Fe_3O_4$), Pigment White 4 (zinc oxide, ZnO), Pigment White 5 (Lithopone, $ZnS/BaSO_4$), Pigment White 6 (titanium oxide, $TiO_2$) and Pigment White 7 (zinc sulfide ZnS).

An overview of organic pigments which can be added to the compositions according to the invention is given by the book by W. Herbst and K. Hunger "Industrielle organische Pigmente—Herstellung, Eigenschaften, Anwendung" (VCH-Verlag Weinheim, New York, Basle, Cambridge, Tokyo, second edition (1995)).

It is also possible to add magnetic, electroconductive, photochromic, thermochromic or luminescent pigments and pigments which have a combination of these properties to the compositions according to the invention.

Besides some organic pigments, for example Lumogen® Yellow 0790 (BASF Aktiengesellschaft), suitable pigments having luminescent properties are also inorganic, doped or undoped compounds essentially based on alkaline earth metal oxides, alkaline earth metal transition metal oxides, alkaline earth metal/aluminum oxides, alkaline earth metal/silicon oxides or alkaline earth metal/phosphorus oxides, alkaline earth metal halides, Zn/silicon oxides, Zn/alkaline earth metal halides, rare-earth metal oxides, rare-earth metal/transition metal oxides, rare-earth metal aluminum oxides, rare-earth metal/silicon oxides or rare-earth metal/phosphorus oxides, rare-earth metal oxide sulfides or oxide halides, zinc oxide, sulfide or selenide, cadmium oxide, sulfide or selenide or zinc/cadmium oxide, sulfide or selenide, where the cadmium-containing compounds are of lower importance owing to their toxicological and ecological relevance.

The dopants used in these compounds are usually aluminum, tin, antimony, rare-earth metals, such as cerium, europium or terbium, transition metals, such as manganese, copper, silver or zinc, or combinations of these elements.

The following luminescent pigments are given by way of example, the notation "compound:element(s)" being taken to mean to the relevant person skilled in the art that said compound has been doped with the corresponding element (s). In addition, for example, the notation "(P,V)", denotes that the corresponding lattice positions in the solid structure of the pigment are randomly occupied by phosphorus and vanadium.

Examples of such compounds which are capable of luminescence are $MgWO_4$, $CaWO_4$, $Sr_4Al_{14}O_{25}$:Eu, $BaMg_2Al_{10}O_{27}$:Eu, $MgAl_{11}O_{19}$:Ce,Tb, $MgSiO_3$:Mn, $Ca_{10}(PO_4)_6(F,Cl)$:Sb,Mn, $(SrMg)_2P_2O_7$:Eu, $SrMg_2P_2O_7$:Sn, $BaFCl$:Eu, $Zn_2SiO_4$:Mn, $(Zn,Mg)F_2$:Mn, $Y_2O_3$:Eu, $YVO_4$:Eu, $Y(P,V)O_4$:Eu, $Y_2SiO_5$:Ce,Tb, $Y_2O_2S$:Eu, $Y_2O_2S$:Tb, $La_2O_2S$:Tb, $Gd_2O_2S$:Tb, LaOBr:Tb, ZnO:Zn, ZnS:Mn, ZnS:Ag, ZnS/CdS:Ag, ZnS:Cu,Al, ZnSe:Mn, ZnSe:Ag and ZnSe:Cu.

Examples which may be mentioned of light, heat and/or oxidation stabilizers as component E) are the following:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, Hydroquinones and alkylated hydroquinones, such as 2,6-di-tert-butyl-4-methoxyphenol, 2,5-di-tert-butylhydroquinone, 2,5-di-tert-amylhydrocrainone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, Tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl) disulfide, Alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl) butyrate], bis(3-tert-butyl-4-hydroxy-5-methylphenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide and isooctyl-3,5-di-tert-butyl-4-hydroxybenzylmercaptoacetate, aromatic hydroxybenzyl compounds, such as 1,3,5-tris(3, 5-di-tert-butyl-4-hydroxybenzyl)-2,4,6-trimethyl-benzene, 1,4-bis(3,5-di-tert-butyl-4-hydroxybenzyl)-2,3,5,6-tetramethyl-benzene and 2,4,6-tris(3,5-di-tert-butyl-4-hydroxybenzyl)phenol, Triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl)isocyanurate and 1,3,5-tris(2-hydroxyethyl)isocyanurate, Benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, Acylaminophenols, such as 4-hydroxylauroylanilide, 4-hydroxystearoylanilide and octyl N-(3,5-di-tert-butyl-4-hydroxyphenyl)carbamate, Propionic and acetic esters, for example of monohydric or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxalamide, 3-thiaundecanol, 3-thiapentadecanol, trimethylhexanediol, trimethylolpropane and 4-hydroxymethyl-1-phospha-2,6,7-trioxabicyclo [2.2.2]-octane, Propionamides based on amine derivatives, such as N,N'-bis(3,5-di-tert-butyl-4-hydroxyphenylpropionyl) hexamethylenediamine, N,N'-bis(3,5-di-tert-butyl-4-hydroxyphenylpropionyl)trimethylenediamine and N,N'-bis (3,5-di-tert-butyl-4-hydroxyphenylpropionyl)hydrazine, Ascorbic acid (Vitamin C) and ascorbic acid derivatives, such as ascorbyl palmitate, laurate and stearate, and ascorbyl sulfate and phosphate, Antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4- diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one and 2,2,6,6-tetramethylpiperidin-4-ol, Phosphites and phosphonites, such as triphenylphosphite, diphenyl alkyl phosphite, phenyl dialkyl phosphite, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)4,4'-biphenylenediphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine, bis(2,4-di-tert-butyl-6-methylphenyl)methyl phosphite and bis(2,4-di-tert-butyl-6-methylphenyl)ethyl phosphite, 2-(2'-Hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3,5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxy phenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy phenyl)benzotriazole, 2-(3'-dodecyl-2'-hydroxy-5'-methylphenyl)benzotriazole and 2-(3'-tert-butyl-2'-hydroxy-5'-(2-isooctyloxycarbonylethyl)phenyl benzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl], sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamates, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, Esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, Acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis (2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,6-tetramethylpiperidin-4-yl)hexamethylenediamine and 4-tert-octylamino-2,6-dichloro-1,3,5-triazine, tris(2,2,6,6-tetramethylpiperidin-4-yl)nitrilotriacetate, tetrakis(2,2,6,6-tetramethylpiperidin-4-yl)1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl)2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl)sebacate, bis(1-octyloxy-2,2,6,6-tetramethylpiperidin-4-yl)succinate, the condensation product of N,N'-bis(2,2,6,6-tetramethylpiperidin-4-yl) hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]-decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl) piperidinyl]-siloxane, Oxalamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

In the context of the present invention, the use of the liquid-crystalline composition according to the invention and its preferred embodiments as a printing ink is claimed. Preferred methods are screen printing, planographic printing and letterpress printing.

Amongst screen printing methods, particular mention may be made of silk screen printing, frame printing, film printing and textile screen printing, a planographic printing method which may be mentioned is in particular offset printing, and letterpress printing methods which may be mentioned are in particular flexographic and book printing.

The present invention furthermore relates to the use of the liquid-crystalline composition according to the invention and its preferred embodiments for printing or coating substrates.

The latter can be articles from a wide variety of areas, for example the automotive and automotive accessory sector, the leisure, sports and games sector, the cosmetics sector, the textile, leather and jewelry sectors, decorations sector, the gift sector, the writing utensil sector, the packaging sector, the construction and domestic sector, the print products sector, and the medical sector.

Examples of such substrates/articles which may be mentioned here are cardboard boxes, packaging, textile and plastic carrier bags, paper, labels, plastic films, vehicles of all types, for example children's vehicles, bicycles, motorcycles, automobiles and trucks, passenger and cargo aircraft and corresponding vehicle/aircraft and vehicle/aircraft accessories, consumer electronic and data processing equipment, in particular casings of such equipment, roller skates, in-line skates, skis, (wind) surfboards, hanggliders, medical equipment and spectacle frames.

In the context of the present invention, the use of the liquid-crystalline composition according to the invention and its preferred embodiments in electro-optical components is furthermore claimed. In this case, for example, low-crosslinking or low-crosslinked positions according to the invention can serve as liquid-crystalline matrices, for example in liquid-crystalline displays and screens. In addition, the compositions according to the invention are also suitable as alignment layers in such displays and screens.

In the context of the present invention, the use of the liquid-crystalline composition according to the invention and its preferred embodiments for counterfeiting-proof marking of articles is furthermore claimed.

These articles are, for example, bank notes, stock certificates and other gratuities, check or credit cards, identity cards, but also packaging of expensive food and tobacco, entry tickets, vouchers and luxury products or such luxury products themselves. The keyword regarding the latter is the prevention or at least impediment of trademark piracy.

In the context of the present invention, the use of the liquid-crystalline composition according to the invention and its preferred embodiments for the production of films or coatings which selectively reflect light in the wavelength range from 250 to 1300 nm is furthermore claimed. Besides (selective) reflection in the visible region of the spectrum, mention may also be made here of reflection of infra-red and ultra-violet light. This can serve, for example, to protect the substrates provided with such films or coatings against heat or UV radiation.

The present invention furthermore relates to polymers or polymerized films obtained by polymerization of the liquid-crystalline composition according to the invention and its preferred embodiments.

Furthermore, the use of these polymerized films obtained in this way as optical filters, in particular polarizing colored filters and notch filters, i.e. narrow-band interference filters, as polarizers, in particular for liquid-crystal displays and screens, as decorations, in particular for lamination purposes, as counterfeiting-proof markings, in particular for check, credit and identity cards, and as reflection media for the selective reflection of radiation in the wavelength range from 250 to 1300 nm.

The present invention also relates to a process for printing or coating a substrate, which comprises i) applying a liquid-crystalline composition according to the invention and its preferred embodiments to the substrate, and, if appropriate, aligning the liquid-crystalline composition on the substrate, ii) if desired, applying at least one further non-liquid-crystalline print or at least one further non-liquid-crystalline layer or carrying out steps i) and ii) in the reverse sequence, iii) if desired, applying at least one absorption layer and/or protective layer and/or optionally thermally activatable adhesive layer, and iv) curing the prints and/or layers produced in steps i) and, if carried out, ii) and/or iii), where the curing can take place either directly after application of each individual print or each individual layer in step i) and, if carried out, ii) and/or iii) or simultaneously.

The present invention furthermore relates to an analogous process to the abovementioned for printing or coating substrates which are at least partially transparent in the wavelength range from 250 to 1300 nm.

For simplification, such printed or coated substrates produced by this process are referred to below as multilayer structures. In addition, the process according to the invention should not be taken to mean just that only prints or only layers are applied in all steps i) and, if used, ii), but instead prints and layers can also be applied to the substrates alternately or in any desired sequence and number.

The first-mentioned process relates in particular to the production of multilayer structures whose properties are evident when viewed from the top, and the last-mentioned process relates to the production of multilayer structures whose properties are evident when viewed from the top or when viewed through, i.e. the corresponding substrates are at least partially transparent in the wavelength range from 250 to 1300 nm.

As already mentioned above, either firstly a corresponding liquid-crystalline composition can be applied to the substrate and then, if desired, at least one further non-liquid-crystalline print or at least one further non-liquid-crystalline layer can be applied, or the latter can be applied first to the substrate and then coated or printed with the liquid-crystalline composition(s).

If, for example, the multilayer structure produced in accordance with the invention is to be used as a lamination film, the (at least partially light-transparent) substrate of the multilayer structure itself forms the outermost layer in the laminated product, and the application of a protective layer (step iii)) is not absolutely necessary.

However, the multilayer structure may also be of such a design that a release layer is applied between the substrate, which is at least partially transparent in the wavelength range from 250 to 1300 nm, and the liquid-crystalline composition; this release layer, after the multilayer structure has been applied to a further substrate via the side facing away from the substrate, enables detachment of the first substrate (now the outer substrate). This can be achieved, for example, in a hot embossing process.

A suitable adjustment of the adhesion properties of the liquid-crystalline composition on the (first) substrate may make application of a release layer unnecessary. The (first) substrate can in this case be removed directly after application to the further substrate.

If the multilayer structure comprises a colored liquid-crystalline composition, an absorption layer can be applied in order to reinforce or vary the shade. If this multilayer structure is used, for example, as lamination means for dark-colored articles, not only is application of a protective layer, but also of a corresponding absorption layer (step iii) unnecessary.

The curing can be carried out directly after each application as described in steps i) and, if used, ii) and/or iii) or—if mixing of the prints/layers can be prevented by suitable measures, for example partial/full drying or through different miscibility and/or viscosities of the printing inks/coating compositions—alternatively simultaneously, i.e. in a curing step (step iii)).

The substrates to be printed or coated may be precoated in one or more colors.

Furthermore, the adhesion properties and/or wetting properties and/or alignment properties of the substrates can, if necessary, be improved by suitable pretreatment.

The adhesion properties can be improved, for example, using adhesion promoters, which have already been listed by way of example under the additives in group c7) (priming of the substrates).

The wetting properties can be improved, for example, using substrate wetting auxiliaries, by means of which the substrate can be appropriately pretreated and which have already been listed by way of example under the additives in group c4).

In addition, the adhesion and wetting properties of the substrates can also be improved by any type of physical/chemical activation. In this connection, particular mention should be made of activation of substrate surfaces by a wide variety of gas plasmas.

An improvement in the alignment properties of the substrates vis à vis the liquid-crystalline compositions according to the invention and their preferred embodiments (in the case where step i) is carried out first) can be achieved, for example, by mechanical or chemical modification of the substrate surface, for example by stretching, polishing, partial dissolution, etching or plasma treatment.

Such procedures for modifying the surface properties of substrates are normally known to the person skilled in the art.

Furthermore, the process according to the invention can also be used for printing or coating substrates which are magnetic, electroconductive, photochromic, thermochromic or luminescent or have a combination of these properties.

In this case, the substrates can have said properties per se (bulk properties). However, these properties can also be imparted by admixing (for example doping) corresponding substances (for example magnetic, electroconductive, photochromic, thermochromic or luminescent pigments or photochromic, thermochromic or luminescent dyes) or by coating, printing or vapor-deposition using corresponding printing inks, coating compositions or vapor-deposition compositions.

In addition, combinations are also suitable, allowing, for example, a fluorescent plastic film (for example mass-colored by means of fluorescent dyes or pigments) additionally to be printed with a magnetic or electroconductive printing ink or paste or vapor-deposition-coated with a metal layer.

If the substrates are precoated in one or more colors, their adhesion properties and/or wetting properties and/or alignment properties have been improved by suitable pretreatment or they have been provided with magnetic, electroconductive, photochromic, thermochromic and/or luminescent properties by coating, printing or vapor deposition, these pretreatments are taken to be part of the substrate and not in the sense of step ii)—if this is carried out before step i).

The application of the prints or layers which takes place, if desired, in step ii) is carried out by means of printing inks or coating compositions by the relevant procedures. These printing inks or coating compositions are based on common binders and solvents and usually also contain (effect) dyes and/or pigments, for example the substances from groups d1) and d2) already mentioned above.

In accordance with step iii), absorption and/or protective layers can also be applied if desired. This is likewise carried out by means of corresponding coating compositions by the relevant procedures. These coating compositions are again based on conventional binders and solvents and generally contain absorbent dyes and/or pigments and usually also additives which give these absorption and/or protective layers increased scratch resistance, for example (see, for example, the additives from group c8) already mentioned above) or counter light-, heat- and/or oxidation-induced degradation of these layers (for example the additives in the component E) likewise already mentioned above).

Particularly advantageous multilayer structures, for example with respect to the provision of counterfeiting-proof markings, can be produced by, in step i), applying colored and photochemically polymerizable liquid-crystalline composition according to the invention to substrates (for example plastic films made from polyethylene terephthalate), polymerizing the compositions by means of UV light, then, in step ii), applying further prints or layers containing, for example, IR- or UV-absorbent or fluorescent dyes or pigments, and (if necessary after curing these prints or layers) applying a final absorption layer.

It should merely be mentioned here that printing methods which can be used for the liquid-crystalline composition and other non-liquid-crystalline layers are—besides conventional coating methods—naturally also full-tone printing methods, such as flexographic, screen or offset printing.

In daylight, viewed from the film side, such multilayer structures only exhibit a single color impression, which is dependent on the viewing angle. Only using an IR or UV lamp and possibly appropriate viewing equipment (for example IR camera) does the additional identification hidden in the multilayer structures become visible.

The present invention furthermore relates to substrates to which the liquid-crystalline composition according to the invention and its preferred embodiments or polymers or polymerized films obtained therefrom have been applied or which have been coated by the processes according to the invention.

EXAMPLE

As starting materials for component A) of the liquid-crystalline compositions according to the invention, liquid-crystalline mixtures and achiral compound as dopant were prepared.

Mixture 1 (M1):

A random mixture of the four possible compounds in which R is the radicals

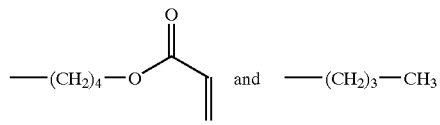

in a random distribution, was prepared in accordance with Example 48 of the specification WO 97/00600 by reacting 1,4-bis(4'-hydroxybenzoyloxy]-2-methylbenzene with a mixture of 4-acryloyloxybutoxy chloroformate and butoxy chloroformate (molar ratio 1:1).

Mixture 2 (M2):

A random mixture of the four possible compounds

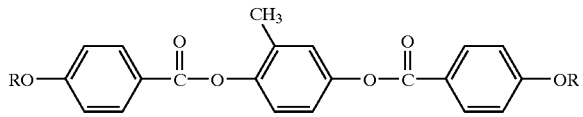

in which R is likewise the radicals

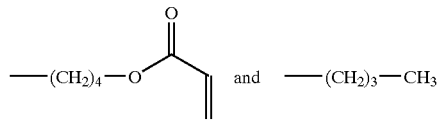

in a random distribution, was prepared in accordance with Example 28 of the specification WO 98/47979 by reacting 1,4-bis[4'-hydroxybenzoyloxy]-2-methylbenzene with a mixture of 4-acryloyloxybutyl chloride and butyl chloride (molar ratio 1:1).

Mixture 3 (M3):

A mixture was prepared from 62.5% by weight of mixture M1 and 37.5% by weight of the compound

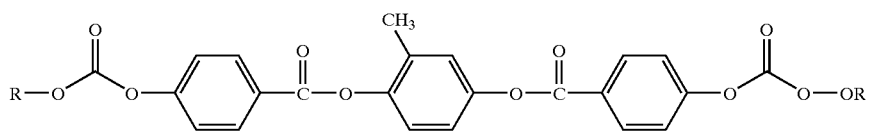

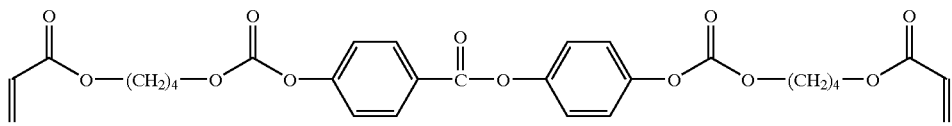

prepared in accordance with Example 18 of the specification WO 97/00600 by reacting 4-(4'-hydroxybenzoyloxy)phenol with 4-acryloyloxybutyl chloroformate.

Compound 1 (C1):
The compounds

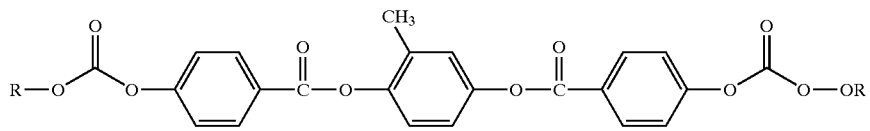

in which R is the radical

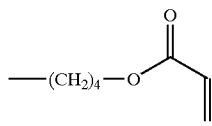

was prepared in accordance with Example 6 of the specification WO 97/00600 by reacting 1,4-bis[4'-hydroxybenzoyloxy]-2-methylbenzene with 4-acryloyloxybutyl chloroformate.

Chiral Compound 1 (CC1):
The chiral compound

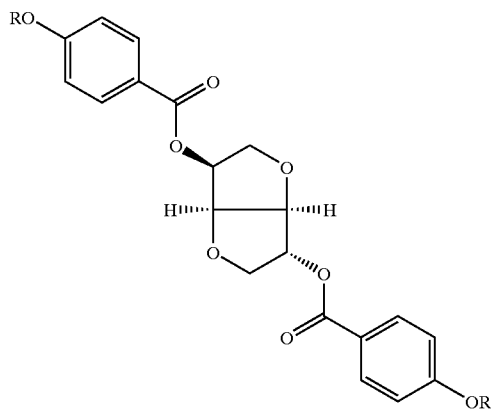

in which R is the radical

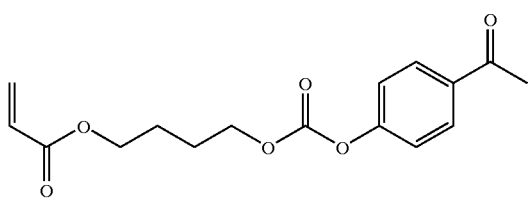

was prepared in accordance with Example 1 of the earlier German Patent application 198 43 724.2 by reacting bis[4'-hydroxybenzoyl]-1,4:3,6-dianhydrosorbitol with 4-acryloyloxybutoxycarbonyloxybenzoyl chloride.

Liquid-crystalline compositions (abbreviated to LCC in the tables) were prepared from components A), if desired B) and if desired C). In the tables below, the percentages are percentages by weight and the ratios are ratios by weight.

Component B):

The photoinitiators (b1)) used were Irgacure® 184, 369 or 907, the reactive thinners (b2)) used were hexanediol diacrylate (Laromer® HDDA, BASF Aktiengesellschaft) or ethoxyethoxyethyl acrylate, and the diluents (b3)) used were Solvesso® 100/L33 or xylene.

Component C):

The antifoams/deaerators (c1)) used were BYK® 57 or TEGO® Airex 900, and the lubricant and flow auxiliary (c2)) used was BYK® 361.

TABLE 1

| LCC | Component A) | Component B) | Component C) | Viscosity |
|---|---|---|---|---|
|  | M1 | — | — | 29.9 Pas |
| 1 | M1 85% | 15% Laromer® HDDA | — | not measured |
| 2 | M1:CC1 (97:3) 84% | 15% Laromer® HDDA | 1% TEGO® Airex 900 | ~3 Pa · s |
| 3 | M1:CC1 (97:3) 96% | 3% Irgacure® 907 | 1% TEGO® Airex 900 | ~39 Pa · s |
| 4 | M1:CC1 (97:3) 81% | 15% Laromer® HDDA, 3% Irgacure® 907 | 1% TEGO® Airex 900 | ~4 Pa · s |
| 5 | M1:CC1 (97:3) 76% | 20% Laromer® HDDA, 3% Irgacure® 907 | 1% TEGO® Airex 900 | ~2 Pa · s |
| 6 | M1:CC1 (97:3) 83.8% | 15% Laromer® HDDA | 1.2% BYK® 361 | ~3 Pa · s |
| 7 | M1:CC1 (97:3) 95.8% | 3% Irgacure® 907 | 1.2% BYK® 361 | ~39 Pa · s |
| 8 | M1:CC1 (97:3) 80.8% | 15% Laromer® HDDA, 3% Irgacure® 907 | 1.2% BYK® 361 | ~4 Pa · s |
| 9 | M1:CC1 (97:3) 75.8% | 20% Laromer® HDDA, 3% Irgacure® 907 | 1.2% BYK® 361 | ~2 Pa · s |

Compositions 1, 2, 4, 6, 8 and in particular 5 and 9 caused no problems in screen printing.

TABLE 2

| LCC | Component A) | Component B) | Component C) | Viscosity |
|---|---|---|---|---|
|  | M2 | — | — | 9.6 Pa · s |
| 10 | M2:CC1 (97:3) | — | — | ~9 Pa · s |
| 11 | M2:CC1 (97:3) 84% | 15% Laromer® HDDA | 1% TEGO® Airex 900 | ~2 Pa · s |
| 12 | M2:CC1 (97:3) 81% | 15% Laromer® HDDA, 3% Irgacure® 907 | 1% TEGO® Airex 900 | ~2 Pa · s |
| 13 | M2:CC1 (97:3) 83.8% | 15% Laromer® HDDA | 1.2% BYK® 361 | ~2 Pa · s |
| 14 | M2:CC1 (97:3) 80.8% | 15% Laromer® HDDA, 3% Irgacure® 907 | 1.2% BYK® 361 | ~2 Pa · s |

Compositions 10, 11, 13 and in particular 12 and 14 cause no problems in the screen printing.

TABLE 3

| LCC | Component A) | Component B) | Component C) | Viscosity |
|---|---|---|---|---|
| 15 | V1:CC1 (97:3) | — | — | not measured |
| 16 | SG 15 96.95% | 3% Irgacure® 907 | 0.05% BYK® 361 | not measured |

Composition 16 causes no problems in screen printing.

TABLE 4

| LCC | Component A) | Component B) | Component C) | Viscosity |
|---|---|---|---|---|
| 17 | M3:CC1 (96.5:3.5) 90% | 9% Laromer® HDDA | 1% Tego® Airex 900 | 4.1 Pa · s |
| 18 | M3:CC1 (96.5:3.5) 96% | 3% Irgacure® 369 | 1% Tego® Airex 900 | 11.5 Pa · s |
| 19 | M3:CC1 (96.5:3.5) 87% | 9% Laromer® HDDA 3% Irgacure® 369 | 1% Tego® Airex 900 | 4.4 Pa · s |
| 20 | M3:CC1 (96.5:3.5) 87% | 9% Laromer® HDDA 3% Irgacure® 184 | 1% Tego® Airex 900 | 3.8 Pa · s |
| 21 | M3:CC1 (95:5) 87% | 9% Laromer® HDDA 3% Irgacure® 369 | 1% Tego® Airex 900 | 4.5 Pa · s |
| 22 | M3:CC1 (95:5) 87% | 9% ethoxyethoxy ethylacrylate 3% Irgacure® 369 | 1% Byk® 57 | 4.3 Pa · s |
| 23 | M3:CC1 (96:4) 85.5% | 10% Laromer® HDDA 3% Irgacure® 369 | 1.5% Tego® Airex 900 | 2.8 Pa · s |
| 24 | M3:CC1 (97:3) 85.5% | 10% Laromer® HDDA 3% Irgacure® 369 | 1.5% Tego® Airex 900 | 2.5 Pa · s |
| 25 | M3:CC1 (97:3) 84% | 9% Laromer® HDDA 3% Irgacure® 369 3% xylene | 1% Tego® Airex 900 | 1.8 Pa · s |
| 26 | M3:CC1 (97:3) 83.5% | 9% Laromer® HDDA 3% Irgacure® 369 3% Solvesso® 100/L33 | 1.5% Tego® Airex 900 | 2.0 Pa · s |
| 27 | M3:CC1 (96:4) 83.5% | 9% Laromer® HDDA 3% Irgacure® 369 4% xylene | 1.5% Tego® Airex 900 | 1.5 Pa · s |

Compositions 17 and 19 to 27 cause no problems in screen printing and the liquid-crystalline composition aligns well. Film formation by the prints was good, and the color change was very clearly pronounced.

Print/coating examples:

In all the examples below, the substrate used was polyethyleneterephthalate film (12 μm thick, Teijin) which had been coated with Composition 16 according to the invention from Table 3 by the method described in the earlier German Patent Application 197 38 369.6 using tetrahydrofuran as diluent.

Preparation of Base Mixture 1 (BM1):

35% by weight of methoxypropyl acetate, 35% by weight of butyl glycol, 20% by weight of white spirit and 10% by weight of Laroflex® MP45 (wetting agent based on PVC, BASF Aktiengesellschaft) were mixed.

Preparation of Base Mixture 2 (BM 2):

55% by weight of butyl glycol, 25% by weight of Laroflex® MP45 (BASF Aktiengesellschaft), 15% by weight of n-hexyl diglycol and 5% by weight of methoxypropyl acetate were mixed. 0.2% by weight of Uvinul® 3039 (light/oxidation stabilizer, BASF Aktiengesellschaft), based on this mixture, was added.

Example 1

A mixture of 20% by weight of Ultraphor® SF MO (a UV-excitable optical brightener) and 80% by weight of BM 1 were diluted with BM 2 in a weight ratio of 1:39 to an Ultraphor® SF MO content of 0.5% by weight in the mixture as a whole. Using the resultant printing ink, a picture was printed onto the side of the plastic film coated with the liquid-crystalline composition by flat-bed screen printing using a fine screen (180 T). After drying, a black full-tone screen print was printed over this picture using a larger screen mesh (120 T).

The black printing ink used for this purpose was prepared by dispersing 20% by weight of carbon black (CK3, Degussa) in 80% by weight of BM 1 and diluting the mixture with BM 2 in a weight ratio of 1:1 to give a carbon black content of 10% by weight in the mixture as a whole.

The colored nature of the liquid-crystalline (cholesteric) layer is emphasized by the coating with the black printing ink. The viewer cannot see the picture hidden in the multilayer structure either in incident light or in transmitted light. However, the picture becomes visible on illumination with a UV lamp (Camag, emitted wavelength 366 nm).

Example 2

A dispersion of 20% by weight of carbon black (CK3, Degussa) and 80% by weight of BM 1 was diluted with BM 2 in a weight ratio of 1:9 to give a carbon black content of 2% by weight in the mixture as a whole. Using this printing ink, a picture was printed on the side of the plastic film coated with the liquid-crystalline compositor by means of flat-bed screen printing using a fine screen (180 T). After drying, a black full-tone screen print was printed on top of this picture using a larger screen mesh (120 T).

The black printing ink used for this purpose was prepared by dispersing 20% by weight of Paliogen Black L 0086 (BASF Aktiengesellschaft) in 80% by weight BM 1 and diluting the mixture with BM2 in a weight ratio of 1:1 to give a Paliogen Black L 0086 content of 10% by weight in the mixture as a whole.

The viewer sees only the color effect of the liquid-crystalline (cholesteric) layer and a black full-tone print. Using IR photography (EMO Elektronik GmbH), only the picture is visible, while the black full-tone print is not reflected.

Example 3

A dispersion of 7.5% by weight of Ultraphor® SF MO and 7.5% by weight of carbon black (CK3) and 85% by weight of BM 1 was diluted with BM 2 in a weight ratio of 1:9 to give an Ultraphor® SF MO and carbon black (CK3) content of 0.75% by weight each in the mixture as a whole. Using this printing ink, a picture was printed on the side of the plastic film coated with the liquid-crystalline composition by means of flat-bed screen printing using a fine screen (160 T). After drying, a black full-tone screen print was printed on top of this picture using a larger screen mesh (120 T).

The black printing ink used for this purpose was prepared as described in Example 2.

The colored nature of the liquid-crystalline (cholesteric) layer is emphasized by the coating with the black printing ink. The viewer cannot see the picture hidden in the multi-layer structure either in incident light or in transmitted light. However, the picture becomes visible both on illumination with a UV lamp and by IR photography.

It is of course also possible to apply different (for example complementary) UV and IR pictures in separate prints/layers.

We claim:

1. A liquid-crystalline composition comprising
   A) a liquid-crystalline mixture comprising
      A1) 44–99.5% by weight based on the total amount of component A) of at least one compound of the formula Ia $$Z^1—Y^1—A^1—Y^3—M^1—Y^4—A^2—Y^2—Z^2 \qquad \text{Ia,}$$

and at least one compound of the formula Ib $$Z^3—Y^5—A^3—Y^7—M^2—P \qquad \text{Ib,}$$

where the variables, independently of one another, are as defined below:
   P is hydrogen, or $C_1$–$C_{15}$ alkyl, which may be monosubstituted or polysubstituted by methyl, fluorine, chlorine or bromine and in which non-adjacent $CH_2$-groups may be replaced by oxygen, sulfur, —CO—, —O—CO—, —CO—O or —O—CO—O—, where the variables are as defined below,
   $Z^1$ to $Z^3$ are polymerizable groups,
   $Y^1$ to $Y^5$ and $Y^7$ are bridging units and are each a single chemical bond, oxygen, sulfur, —O—CO—, —CO—O—, —O—CO—O—,
   —CO—NR—, —NR—CO, —O—CO—NR—, —NR—CO—O—, or —NR—CO—NR—,
   $Z^1$—$Y^1$—, $Z^2$—$Y^2$—, and $Z^3$—$Y^5$— are selected from the group consisting of methacryloyloxy, acryloyloxy and vinyloxy,
   R is hydrogen or $C_1$–$C_4$ alkyl,
   $A^1$ to $A^3$ are spacers having 1 to 30 carbon atoms, in which the carbon chain may be monosubstituted or polysubstituted by methyl, fluorine, chlorine or bromine and/or interrupted by ether oxygen, thioether sulfur or by non-adjacent imino or $C_1$–$C_4$ alkylimino groups,
   $M^1$ is a mesogenic group of the formula Ic $$—T^1—Y^9—T^{1'}— \qquad \text{Ic,}$$

and
   $M^2$ is a mesogenic group of the formula Id $$(—T^2—Y^{10})_r—T^2 \qquad \text{Id,}$$

where the variables in the formulae Ic and Id, independently of one another, are as defined below:
   $T^1$, $T^{1'}$ and $T^2$ are divalent saturated or unsaturated carbocyclic or heterocyclic radicals,
   $Y^9$ and $Y^{10}$ are bridging units as defined for $Y^1$ to $Y^5$ and $Y^7$ or —$CH_2$—O—, —O—$CH_2$—, —CH=N—, —N=CH— or —N=N—,
   r is a value of 0, 1, 2 or 3,
   where the radicals $T^2$ and $Y^{10}$, in the case where r is not 0, may be identical or different, and
   A2) at least one chiral compound selected from the group consisting of $$(Z^5—Y^{11})_nX \qquad \text{Ie,}$$

$$(Z^5—Y^{11}—A^5—Y^{12})_nX \qquad \text{If,}$$

and $$(Z^{11}—Y^{11}—A^5—Y^{12}—M—Y^{13})_nX \qquad \text{Ih,}$$

in which the variables $Z^5$ and $Z^{11}$ are polymerizable groups, $Y^{11}$ to $Y^{13}$ are bridging units, $A^5$ are spacers and M are mesogenic groups and which have the same general meaning as the variables $Y^1$ to $Y^5$ and $Y^7$, $A^1$ to $A^3$ and $M^1$ and $M^2$ in the formulae Ia and Ib and for $M^1$ and $M^2$ in the formulae Ic and Id, n is 1, 2, 3, 4, 5 or 6, X is an n-valent chiral radical where the n groups bonded to the chiral radical X may be identical or different,
B) further additives selected from the group consisting of
   b1) photoinitiators,
   b2) reactive thinners and
   b3) diluents, and
C) if desired, further additives selected from the group consisting of
   c1) antifoams and deaerators,
   c2) lubricants and flow-control agents,
   c3) thermal curing or radiation-curing auxiliaries,
   c4) substrate wetting auxiliaries,
   c5) wetting and dispersion auxiliaries,
   c6) hydrophobicizing agents,
   c7) adhesion promoters and
   c8) auxiliaries for improving the scratch resistance, and
D) if desired, further additives selected from the group consisting of d1) dyes and d2) pigments, and E) if desired, further additives selected from the group consisting of light, heat and/or oxidation stabilizers that stabilize the liquid-crystalline composition against light, heat and/or oxidation, where additives B), C), D) and E) are dispersed throughout the liquid-crystalline mixture A).

2. The liquid-crystalline composition as claimed in claim 1, having a viscosity of from 0.5 to 10.0 Pa s at 20° C.

3. A printing ink comprising the liquid-crystalline composition of claim 1.

4. A process comprising printing or coating a substrate with a composition comprising the liquid-crystalline composition as claimed in claim 1.

5. An electro-optical component comprising the liquid-crystalline composition as claimed in claim 1.

6. A process comprising counterfeit-proof marking articles with a composition comprising the liquid-crystalline composition as claimed in claim 1.

7. A process comprising coating a substrate with a composition comprising the liquid-crystalline composition as claimed in claim 1 to produce a film or coating which selectively reflects light in the wavelength range of from 250 to 1300 nm.

8. A polymer or polymerized film obtained by polymerizing the liquid-crystalline composition as claimed in claim 1.

9. An optical filter, polarizer, decoration, counterfeiting-proof marking or reflection medium for the selective reflection of radiation in the wavelength range of from 250 to 1300 nm comprising the polymer or polymerized film as claimed in claim 8.

10. A process for printing or coating a substrate, which comprises:

i) applying the liquid-crystalline composition as claimed in claim 1 to the substrate, and, if appropriate, aligning the liquid-crystalline composition on the substrate, and ii) if desired, applying at least one further non-liquid-crystalline print or at least one further non-liquid-crystalline coating, or carrying out steps i) and ii) in the reverse sequence, and iii) if desired, applying at least one absorption layer and/or protective layer and/or thermally activatable adhesive layer, and iv) curing the prints and/or coatings produced in step i) and, if carried out, step ii) and/or step iii), where the curing can take place either directly after application of each individual print or each individual coating in step i) and, if carried out, step ii) and/or step iii) or simultaneously.

11. The process as claimed in claim 10, wherein said substrate is at least partially transparent in the wavelength range from 250 to 1300 nm.

12. The process as claimed in claim 10, in which said substrate may be precoated in one or more colors.

13. A process for making counterfeiting-proof markings comprising the process as claimed in claim 10, wherein said liquid-crystalline composition in step i) is a colored and photochemically polymerizable liquid-crystalline composition and step i) comprises polymerizing said liquid-crystalline composition by UV-light; wherein step ii) comprises further applying prints or coatings containing IR- or UV-absorbent or fluorescent dyes or pigments, and wherein step iii) comprises applying a final absorption layer.

14. The process as claimed in claim 10, wherein in step i) and, if used step ii) prints and coatings are applied alternately or in any sequence and number.

15. A substrate which has been printed or coated by the process as claimed in claim 14.

16. A substrate which has been printed or coated by the process as claimed in claim 10.

17. A substrate which has been printed or coated by the process as claimed in any one of claims 11 to 13.

* * * * *